United States Patent [19]
Nishikawa

[11] Patent Number: 5,851,084
[45] Date of Patent: Dec. 22, 1998

[54] ROTOR FIXTURE

[75] Inventor: Takahiro Nishikawa, Osaka, Japan

[73] Assignee: Tsubakimoto Chain Co., Osaka, Japan

[21] Appl. No.: 747,959

[22] Filed: Nov. 12, 1996

[30] Foreign Application Priority Data

Dec. 13, 1995 [JP] Japan .................................. 7-324739
May 10, 1996 [JP] Japan .................................. 8-116799

[51] Int. Cl.$^6$ .................................................. F16D 1/08
[52] U.S. Cl. ........................ 403/344; 403/290; 403/373
[58] Field of Search .................................. 403/344, 373,
403/289, 290, 309, 310, 312, 313, 374,
367, 371, 409.1

[56] References Cited

U.S. PATENT DOCUMENTS

| | | | |
|---|---|---|---|
| 3,139,296 | 6/1964 | Greene | 403/373 |
| 3,236,572 | 2/1966 | White, Sr. | 403/344 X |
| 3,281,170 | 10/1966 | Kaplan | 403/373 |
| 3,473,202 | 10/1969 | Howard | 403/290 X |
| 3,851,983 | 12/1974 | MacKenzie | 403/312 |
| 3,917,424 | 11/1975 | Zugel | 403/344 X |
| 4,217,061 | 8/1980 | Eiland et al. | 403/344 X |
| 4,475,842 | 10/1984 | Onaya | 403/370 |
| 4,486,116 | 12/1984 | Sassi | 403/367 |
| 4,565,464 | 1/1986 | Nilsson | 403/290 |
| 4,781,486 | 11/1988 | Mochizuki | 403/303 |
| 5,039,245 | 8/1991 | Hansen | 403/370 |
| 5,067,845 | 11/1991 | Schlueter | 403/344 |
| 5,306,096 | 4/1994 | Tuns et al. | 403/344 |

FOREIGN PATENT DOCUMENTS 626338  2/1987  Japan .

*Primary Examiner*—Harry C. Kim
*Attorney, Agent, or Firm*—Dann, Dorfman, Herrell and Skillman; Henry H. Skillman

[57] ABSTRACT

A fixture for mounting a rotor having a cylindrical bore on a cylindrical shaft having a first section adapted to be clamped within the bore of the rotor by expansion of its outer periphery, and a second section adapted to be clamped onto the shaft by contraction of its central bore. The second section has complementary partial-circular segments. A fastener is mounted on one side of the shaft to cause the segments on one side of the shaft to close and grip the shaft. Further tightening of the fastener effects separation of the segments on another side of the shaft. The first section has two partial-circular segments joined with the two segments of the second section, so that when the segments of the second section are separated, the segments of the first section is likewise separated to clamp the first section within the bore of the rotor. There may be two, three or four sections allowing one or two first sections to clamp against the inside bore of the rotor and the other second sections to clamp against the shaft. The two segments of each section may be formed integrally or separated, and may include keyways to avoid gulling on the shaft and rotor.

17 Claims, 17 Drawing Sheets

ROTOR FIXTURE

FIELD OF THE INVENTION

This invention relates to a rotor fixture for fixing a rotor to a shaft.

BACKGROUND OF THE INVENTION

Conventionally, as means for fixing a rotor such as pulley and gear to a shaft, for example, Japanese Utility Model Kokai Publication Showa 62-6338 (1987) disclosed a rotor fixture having a structure in which, wedge taper planes are formed respectively on both exposed sides of an inner race engaged on the peripheral surface of a shaft and an outer race engaged on the inside peripheral surface of the hub of a rotor, a pair of taper rings is wedge-engaged between the respective wedge taper planes by tightening many tightening bolts, thereby the diameter of the inside peripheral surface of the inner race is contracted so as to press it on the peripheral surface of the shaft, and also the peripheral surface of the outer race is expanded so as to be pressed on the inside peripheral surface of the hub to tighten the shaft and the hub.

In the rotor fixture described in the above-mentioned Japanese Utility Model, Kokai Publication Showa 62-6338 (1987), many tightening bolts are used, therefore it takes long time for tightening, and, further, the tightening bolts are parallel to a shaft. Therefore, a working space in the axial direction is required and these problems are disadvantageous.

SUMMARY OF THE INVENTION

It is an object of the present invention to provide a rotor fixture which solves the above-mentioned conventional technical problems, which is capable of anchoring quickly and easily a rotor to a shaft, does not require a working space in the axial direction when the anchoring work is done, is capable of fixing firmly a shaft to a rotor, further has a simple structure, and is manufactured easily.

The fixture has at least two sections disposed along the axis of the shaft, a first section adapted to be anchored in the bore of the rotor and a second section adapted to be anchored around the shaft. Each section is annular in form and comprises fan-shaped segments arranged about the circumference of the shaft. Clamping means is operable to urge the segments in the second section circumferentially together to clamp the second section on the shaft with a single fastener.

To achieve the above-mentioned object, a rotor fixture is provided with a cylindrical elastically deformable diameter expanding deformation first section having a peripheral surface which is for engaging to the central bore of a rotor and a through hole though which hole a shaft is to be inserted, a radial diameter expanding slit being cut-formed extending to the through hole on one location on the peripheral surface, and an elastically deformable diameter contracting deformation second section having a squeezing hole for engaging to the shaft and being slit to two semi-circular segments by a splitting slit extending across the squeezing hole approximately in the diametrical direction. The rotor fixture has a structure in which the diameter contracting deformation second section is provided adjacent to the diameter expanding deformation first section, the two sections are joined at both side portions near the diameter expanding slit of the diameter expanding deformation first section so as to deform solidly with the both portions, and the two segments of the second section are linked each other by a squeezing bolt inserted through the diameter contracting deformation section across the splitting slit at the opposite side beyond the squeezing hole to the side which is combined to the diameter expanding deformation first section.

Rivet holes may be formed in the axial direction on the both side portions of the first section near the diameter expanding slit and on two portions of the second section, and the first and second sections are combined preferably so as to deform solidly with aid of rivets inserted through the rivet holes on the second section and the rivet holes on the first section. The diameter contracting deformation first sections may be provided symmetrically on both sides of the diameter expanding deformation section.

The rotor fixture may further comprise preferably a structure in which an auxiliary elastically deformable diameter contracting deformation section having an auxiliary squeezing hole to be engaged to the shaft and having a radial contracting slit extending to the auxiliary squeezing hole located at one location on the peripheral surface thereof formed by cutting is provided adjacent on the side of the diameter expanding deformation section opposite to the side where the diameter contracting deformation section is provided adjacent to the diameter expanding deformation section, on the diameter expanding deformation section, a diameter contracting slit is cut-formed extending from the peripheral surface to the through hole at the opposite side to said diameter expanding slit and through hole, and both sides near the diameter contracting slit of the diameter expanding deformation section is combined to both sides near the diameter contracting slit of the auxiliary diameter contracting deformation section so as to deform solidly respectively.

Further, the rotor fixture preferably comprises a structure in which the diameter expanding deformation section, diameter contracting deformation section, and auxiliary diameter contracting deformation section are partially combined and are partially separated each other by the first slit cut-formed with inclination to the one end side from one side on the peripheral surface near the one end side of the elastically deformable cylindrical body having the through hole to be engaged with the shaft at the center to the half way beyond the center of the through hole, and the second slit cut-formed with inclination to the other end side from the other side of the peripheral surface near the other end of the cylindrical body to the half way beyond the center of the through hole, the through hole comprises the through hole of the diameter expanding deformation section, squeezing hole of the diameter contracting deformation section, and the auxiliary squeezing hole of the auxiliary diameter contracting deformation section, by the third slit formed radially extending from the starting position of cutting of the first slit on the peripheral surface of the cylindrical body to the position of the through hole across the first slit, the half of the splitting slit of the diameter contracting deformation section and the diameter contracting slit extending from the diameter expanding deformation section to the auxiliary diameter contracting deformation section are formed, and by the fourth slit formed radially extending from the starting position of cutting of the second slit on the peripheral surface of the cylindrical body to the through hole continuously from the diameter contracting deformation section to the diameter expanding deformation section across the second slit, the residual half of the splitting slit of the diameter contracting deformation section and the diameter expanding slit of the diameter expanding deformation section are formed.

To achieve the above-mentioned object, a rotor fixture may comprise a diameter contracting deformation section with the fan-shaped cross-section having radii inside peripheral surface to be fitted to the peripheral surface of a shaft, a diameter expanding deformation section with the fan-shaped cross-section having the radii inside peripheral surface along the peripheral surface of the shaft and the radii peripheral surface to be fitted on the inside peripheral surface of the central hole of the rotor which diameter expanding deformation section is provided adjacent coaxially to the one side of the diameter contracting deformation section in the direction of the shaft, a bridge section with the fan-shaped cross-section provided between both ends in the circumferential direction of the diameter contracting deformation section and diameter expanding deformation section respectively, and having the radii inside peripheral surface to be fitted on the peripheral surface of the shaft and the radii peripheral surface to be fitted on the inside peripheral surface of the central hole of the rotor at the position at least facing to the diameter expanding deformation section, and a squeezing bolt for combining in the circumferential direction between the one end in the circumferential direction of the diameter contracting deformation section and the bridge section. The rotor fixture has a structure in which the portion near the other end in the circumferential direction of the diameter contracting deformation section is combined solidly to the portion near the one end of the diameter expanding deformation section in the same circumferential direction as the other end with interposition of a joint section, and when the squeezing bolt is screwed, the deformation is restricted in the circumferential direction to the bridge section on the other end in the circumferential direction of the diameter expanding deformation section, thereby the diameter of the inside peripheral surface of the diameter contracting deformation section is contracted and the diameter of the peripheral surface of the diameter expanding deformation section is expanded. The bridge section may be formed monolithically with the other end in the circumferential direction of the diameter expanding deformation section continuously.

A rotor fixture may also comprise the first diameter contracting deformation section with the fan-shaped cross-section having radii inside peripheral surface to be fitted to the peripheral surface of a shaft, a diameter expanding deformation section with the fan-shaped cross-section having the radii inside peripheral surface along the peripheral surface of the shaft and the radii peripheral surface to be fitted on the inside peripheral surface of the central hole of the rotor which diameter expanding deformation section is provided adjacent coaxially to the one side of the first diameter contracting deformation section in the direction of the shaft, the second diameter contracting deformation section with the fan-shaped cross-section having the radii inside peripheral surface to be fitted on the peripheral surface of the shaft which second diameter contracting deformation section is provided coaxially adjacent to the diameter expanding deformation section on the opposite side in the axial direction to the first diameter contracting deformation section, a bridge section with the fan-shaped cross-section having the radii inside peripheral surface to be fitted on the peripheral surface of the shaft and having the radii peripheral surface to be fitted on the inside peripheral surface of the central hole of the rotor at the position at least facing to the diameter expanding deformation section, which bridge section is provided between both ends in the circumferential direction of the first diameter contracting deformation section, diameter expanding deformation section, and second diameter contracting deformation section respectively, and a squeezing bolt for combining in the circumferential direction between the one end in the circumferential direction of the first diameter contracting deformation section and the bridge section. The rotor fixture has a structure in which the portion near the other end in the circumferential direction of the first diameter contracting deformation section is combined solidly to the portion near the one end of the diameter expanding deformation section in the same circumferential direction as the other end with interposition of the first joint section, the portion near the other end in the circumferential direction of the diameter expanding deformation section is combined solidly to the portion near the one end of the second diameter contracting deformation section in the same circumferential direction as the other end with interposition of the second joint section, and when the squeezing bolt is screwed, the deformation in the circumferential direction is restricted to the bridge section of the other end in the circumferential direction of the second diameter contracting deformation section, thereby the diameters of the radii inside peripheral surfaces of respective the first diameter contracting deformation section and second diameter contracting deformation section are contracted, and the diameter of the radii peripheral surface of the diameter expanding deformation section is expanded. The bridge section is formed monolithically with the other end in the circumferential direction of the second diameter contracting deformation section continuously.

A rotor fixture may also comprise the first diameter contracting deformation section with the fan-shaped cross-section having the radii inside peripheral surface to be fitted on the peripheral surface of a shaft, the first diameter expanding deformation section with the fan-shaped cross-section provided adjacent to the one side in the axial direction of the first diameter contracting deformation section coaxially and having the radii inside peripheral surface along the peripheral surface of the shaft and the radii peripheral surface to be fitted on the inside peripheral surface of the central hole of a rotor, the second diameter contracting deformation section with the fan-shaped cross-section provided adjacent to the opposite side of the first diameter expanding deformation section in the axial direction to the first diameter contracting deformation section coaxially, and having the radii inside peripheral surface to be fitted on the peripheral surface of the shaft, the second diameter expanding deformation section with the fan-shaped cross-section provided adjacent to the opposite side of the second diameter contracting deformation section in the axial direction to the first diameter expanding deformation section coaxially, and having the radii inside peripheral surface along the peripheral surface of the shaft and the radii peripheral surface to be fitted on the inside peripheral surface of the center hole of a rotor, a bridge section with the fan-shaped cross-section provided between both respective ends in the circumferential direction of the first diameter contracting deformation section, first diameter expanding deformation section, second diameter contracting deformation section, and second diameter expanding deformation section, and having the radii inside peripheral surface to be fitted on the peripheral surface of the shaft and having the radii peripheral surface to be fitted on the inside peripheral surface of the central hole of the rotor at least at the position facing to the first diameter expanding deformation section and second diameter expanding deformation section, and a squeezing bolt for combining in the circumferential direction between the one end in the circumferential direction of the first diameter contraction deformation section and the bridge section.

The rotor fixture may have a structure in which the portion near the other end in the circumferential direction of the first diameter contracting deformation section is combined solidly to the portion near the one end of the first diameter expanding deformation section in the same circumferential direction as the other end with interposition of the first joint section, the portion near the other end in the circumferential direction of the first diameter expanding deformation section is combined solidly to the portion near the one end of the second diameter contracting deformation section in the same circumferential direction as the other end with interposition of the second joint section, the portion near the other end in the circumferential direction of the second diameter contracting deformation section is combined solidly to the portion near on the one end of the second diameter expanding deformation section in the same circumferential direction as the other end with interposition of the third joint section, and when the squeezing bolt is screwed, the deformation in the circumferential direction to the bridge section on the other end in the circumferential direction of the second diameter expanding deformation section, thereby the diameters of respective radii inside peripheral surface of the first diameter contracting deformation section and second diameter contracting deformation section are contracted and the diameters of respective radii peripheral surface of the first diameter expanding deformation section and second diameter expanding deformation section are expanded. The bridge section may be formed monolithically with the other end in the circumferential direction of the second diameter expanding deformation section continuously.

A rotor fixture may comprise the first diameter contracting deformation section with the fan-shaped cross-section having the radii inside peripheral surface to be fitted on the peripheral surface of a shaft, the first diameter expanding deformation section with the fan-shaped cross-section provided adjacent to the one side in the axial direction of the first diameter contracting deformation section coaxially, and having the radii inside peripheral surface along the peripheral surface of the shaft and having the radii peripheral surface to be fitted on the inside peripheral surface of the central hole of a rotor, the second diameter contracting deformation section with the fan-shaped cross-section provided adjacent to the opposite side of the first diameter expanding deformation section in the axial direction to the first diameter contracting deformation section coaxially, and having the radii inside peripheral surface to be fitted on the peripheral surface of the shaft, the second diameter expanding deformation section with the fan-shaped cross-section provided adjacent to the opposite side of the second diameter contracting deformation section in the axial direction to the first diameter expanding deformation section coaxially, and having the radii inside peripheral surface along the peripheral surface of the shaft and having the radii peripheral surface to be fitted on the inside peripheral surface of the central hole of the rotor, the third diameter contracting deformation section with the fan-shaped cross-section provided adjacent to the opposite side of the second diameter expanding deformation section in the axial direction to the diameter contracting deformation section coaxially, and having the radii inside peripheral surface to be fitted on the peripheral surface of the shaft, a bridge section with the fan-shaped cross-section provided between respective both ends in the circumferential direction of the first diameter contracting deformation section, first diameter expanding deformation section, second diameter contracting deformation section, second diameter expanding deformation section, and third diameter contracting deformation section, and having the radii inside peripheral surface to be fitted on the peripheral surface of the shaft and having the radii peripheral surface to be fitted on the inside peripheral surface of the central hole of the rotor at least at the position facing to the first diameter expanding deformation section and second diameter expanding deformation section, and a squeezing bolt for combining in the circumferential direction between the one end in the circumferential direction of the first diameter contracting deformation section and the bridge section. The rotor fixture has a structure in which the portion near the other end in the circumferential direction of the first diameter contracting deformation section is combined solidly to the portion near the one end of the first diameter expanding deformation section in the same circumferential direction as the other end with interposition of the first joint section, the portion near the other ends in the circumferential direction of the first diameter expanding deformation section is combined solidly to the portion near the one end of the second diameter contracting deformation section in the same circumferential direction as the other end with interposition of the second joint section, the portion near the other end in the circumferential direction of the second diameter contracting deformation section is combined solidly to the portion near the one end of the second diameter expanding deformation section in the same circumferential direction as the other end with interposition of the third joint section, the portion near the other end in the circumferential direction of the second diameter expanding deformation section is combined solidly to the portion near the one end of the third diameter contracting deformation section in the same circumferential direction as the other end with interposition of the fourth joint section, and when the squeezing bolt is screwed, the deformation in the circumferential direction to the bridge section of the other end in the circumferential direction of the third diameter contracting deformation section is restricted, thereby the diameters of respective radii inside peripheral surfaces of the first diameter contracting deformation section, second diameter contracting deformation section, and third diameter contracting deformation section are contracted, and the diameters of respective radii peripheral surface of the first diameter expanding deformation section and second diameter expanding deformation section are expanded. The bridge may be formed monolithically with the other end in the circumferential direction of the third diameter contracting deformation section continuously.

Keyways are formed preferably in the axial direction at least on any one of the inside peripheral surface and peripheral surface of the bridge section.

Further, the diameter contracting deformation sections and diameter expanding deformation sections may be provided preferably on the one side separated by a plane including the shaft axis and the bridge section is provided on the other side and has a shape approximately symmetrical with the diameter contracting deformation section and diameter expanding deformation section with respect to the plane.

When a rotor is fixed to a shaft, in the case of the first embodiment of the rotor fixture, the through hole of the diameter expanding deformation section and the squeezing hole of the diameter contracting deformation section are inserted and engaged to a shaft, and the peripheral surface of the diameter expanding deformation section is engaged to the central hole formed on the boss of the rotor, then the mounting position of the rotor on the shaft is positioned, thereafter the squeezing bolt is screwed using a tool such as wrench, the portions near the squeezing bolt of the diameter contracting deformation section split to two sections by the splitting slit is drawn near each other, the inside peripheral surface of the squeezing hole is pressed on the peripheral surface of the shaft.

When the squeezing bolt is tightened more, the space of the splitting slit at the portion on the opposite side with respect to the above-mentioned squeezing hole to the side through which the squeezing bolt is inserted is expanded due to elastic deformation, and with the expansion, the space of the diameter expanding slit of the diameter expanding deformation section is expanded to press the peripheral surface of the diameter expanding deformation section onto the inside peripheral surface of the above-mentioned central hole. When the expansion continues until the deformation in the outward direction of the peripheral surface of the diameter expanding deformation section is restricted, the space of the diameter expanding slit can not be expanded more, the inside peripheral surface of the squeezing hole is strongly pressed on to the shaft by tightening the squeezing bolt, then the diameter contracting deformation section is fixed on the shaft and the diameter expanding deformation section is fixed on the rotor, thus the shaft and the rotor are fixed solidly with interposition of the rotor fixture.

In the case of a second embodiment of the rotor fixture, the rotor fixture is inserted and engaged to a shaft in the same manner as described for the above-mentioned rotor fixture, the squeezing bolt is tightened in the condition that the diameter expanding deformation section is engaged to the central hole of a rotor. Thereby, the space of the diameter expanding slit of the diameter expanding deformation section is expanded, the peripheral surface of the diameter expanding deformation section is pressed on the inside peripheral surface of the central hole, when the expansion continues until the deformation is restricted, the diameter contracting slit formed on the opposite side with respect to the through hole to the diameter expanding slit is narrowed. Thereby, the space of the diameter contracting slit of the auxiliary diameter contracting deformation section combined solidly to the diameter expanding deformation section is also narrowed, the inside peripheral surface of the auxiliary squeezing hole is pressed on to the peripheral surface of the shaft, in the same time, the diameter expanding deformation section is fixed on the rotor, thus the shaft and rotor are fixed solidly each other with interposition of the rotor fixture.

Further, when a rotor is fixed to a shaft using other embodiments of a rotor fixture, the rotor fixture is mounted to the shaft, the peripheral surface of the diameter expanding deformation section and the peripheral surface of the bridge section are engaged to the central hole of the rotor. Then, by tightening the squeezing bolt, the one end in the circumferential direction of the diameter contracting deformation section is drawn near to the bridge section side by the above-mentioned squeezing bolt. As the result, a rotational force around the shaft is exerted on the diameter contracting deformation section. The above-mentioned rotational force is transmitted to the adjacent diameter expanding deformation section through the joint section of the portion near the other end in the circumferential direction of the diameter contracting deformation section.

The deformation in the circumferential direction to the above-mentioned bridge section of the portion of the diameter expanding deformation section at the position farthest in the axial direction from the diameter contracting deformation section having the squeezing bolt or the end farthest in the circumferential direction from the joint section of the diameter contracting deformation section is restricted, therefore, when the above-mentioned rotational force is exerted, the diameter of the inside peripheral surface of the diameter contracting deformation section is contracted to be pressed on the peripheral surface of the shaft, on the other hand, the diameter of the peripheral surface of the diameter expanding deformation section is expanded to be pressed on the inside peripheral surface of the central hole of the rotor, thus the shaft is fixed to the rotor with interposition of the rotor fixture.

When, the inclination of the bridge section to the shaft is blocked by the contact of the inside peripheral surface and peripheral surface of the bridge section on the peripheral surface of the shaft and the inside peripheral surface of the central hole of the rotor respectively, thereby the bridge section supports the reaction force from the diameter contracting deformation section and the diameter expanding deformation section.

In the case where there is a plurality of diameter contracting deformation sections and diameter expanding deformation sections, by tightening the squeezing screw, inside peripheral surface of all the diameter contracting deformation sections and peripheral surface of all the diameter expanding deformation sections are pressed on the peripheral surface of the shaft and the inside peripheral surface of the central hole of the rotor respectively, thus the rotor is fixed firmly to the shaft.

BRIEF DESCRIPTION OF THE DRAWINGS

All of the objects of the present invention are more fully set forth hereinafter with reference to the accompanying drawings, wherein.

DETAILED DESCRIPTION OF THE PREFERRED EMBODIMENTS

Figure 1:
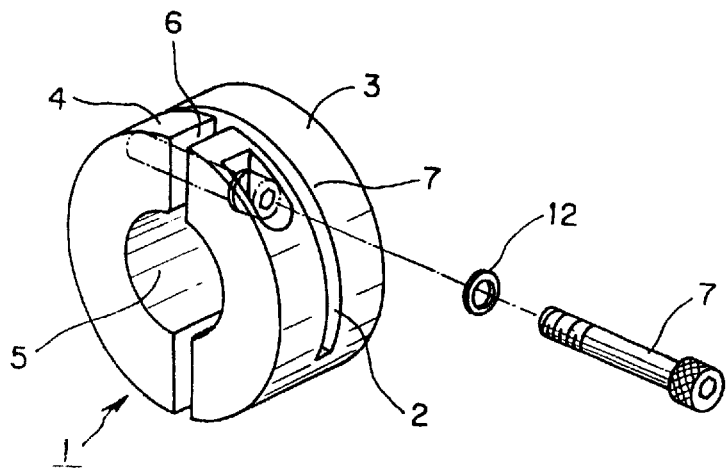
FIG. 1 is a perspective view of a rotor fixture illustrating the first embodiment of the present invention.

Embodiments of the present invention will be described referring to the drawings.

FIGS. 1–4 illustrate the first embodiment of a rotor fixture of the present invention in which the rotor fixture 1 is formed cylindrically of an elastically deformable materials such as steel and aluminum, and sectioned to cylindrical two sections, namely diameter expanding deformation section 3 and diameter contracting deformation section 4, by a slit 2 which is cut-formed in a fan shape with a center angle of approximately 270 degrees in diametral direction from the one location on the peripheral surface.

The above-mentioned diameter contracting deformation section 4 has a squeezing hole 5 at the center thereof, split to two sections by a splitting slit 6 provided across said squeezing hole 5 in the diametral direction, and has a squeezing bolt 7 provided across the above-mentioned splitting slit 6 above the squeezing hole 5.

Figure 2:
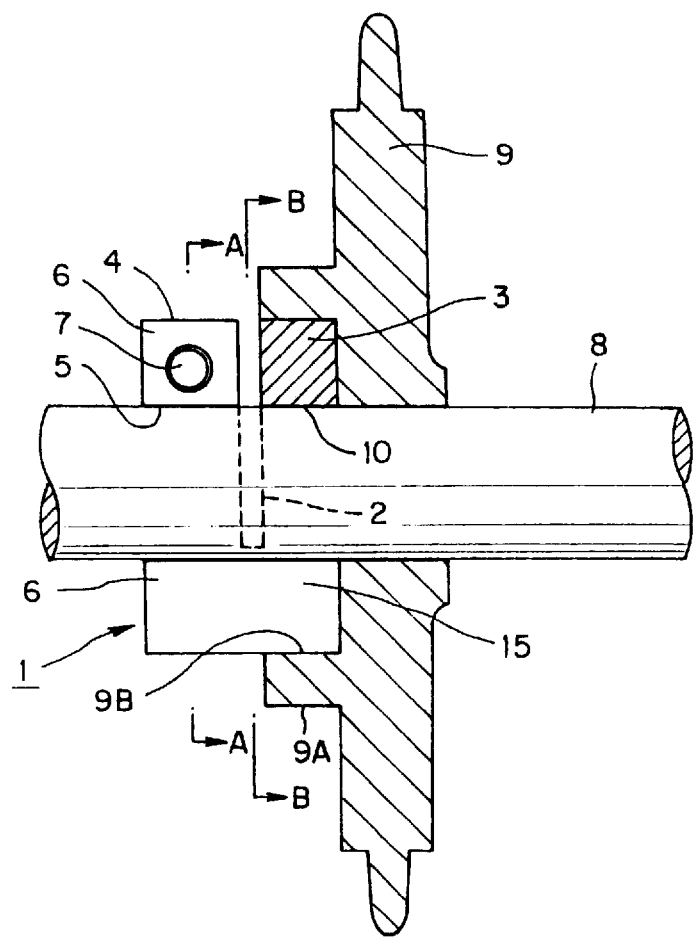
FIG. 2 is a cross-sectional view of a rotor fixture of the present invention illustrating the condition of using.

FIG. 2 is a cross-sectional view in the axial direction at the position of the splitting slit 6 for illustrating the condition in which a rotor 9 is fixed on a shaft 8 using the rotor fixture 1. As shown in the figure, a through hole 10 is formed with the axis thereof coinciding with that of the above-mentioned squeezing hole 5 at the center portion of the diameter expanding deformation section 3, and the shaft 8 is inserted through the above-mentioned squeezing hole 5 and through hole 10. The peripheral surface of the diameter expanding deformation section 3 is engaged to the central hole 9B of the boss 9A of the rotor 9.

Figure 3:
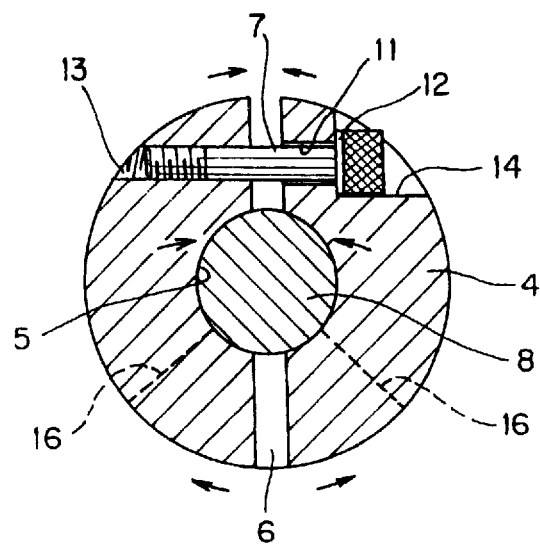
FIG. 3 is a cross-sectional view in the arrow direction at the position of A—A line in FIG. 2.

FIG. 3 is a cross-sectional view from the arrow direction at the A—A line on FIG. 2, as shown in the figure, the above-mentioned squeezing bolt 7 is inserted to the bolt through hole 11 formed on the one side of the diameter contracting deformation section 4 slit by the splitting slit 6 with interposition of a washer 12 from the periphery side, and is screwed to a tapped hole 13 formed coinciding with the axis of the above-mentioned bolt through hole 11 on the other side. A cut-off 14 is formed around the opening of the above-mentioned bolt through hole 11 for accommodation of the head of squeezing bolt 17.

Figure 4:
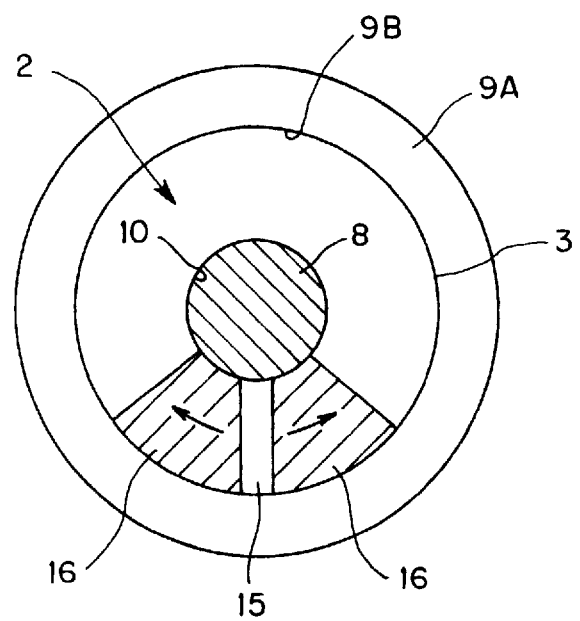
FIG. 4 is a cross-sectional view in the arrow direction at the position of B—B line in FIG. 2.

Next, FIG. 4 is a cross-sectional view from the arrow direction at the B—B line on FIG. 2, a diameter expanding slit 15 extending from the one location on the peripheral surface is cut-formed in the radial direction on the diameter expanding deformation section 3.

The above-mentioned diameter expanding slit 15 is communicated in the axial direction to the splitting slit 6 at the position on the side opposite to the side where the squeezing bolt 7 is inserted with respect to the squeezing hole 5, and separates the fan-shaped joint section 16 which connects the diameter expanding deformation section 3 and the diameter contracting deformation section 4 to two sections in radial direction at the center.

When a rotor 9 is fixed to the shaft 8 as shown in FIG. 2 using the above-mentioned rotor fixture 1, the peripheral surface of the diameter expanding deformation section 3 side of the rotor fixture 1 is engaged to the central hole 9B of the rotor 9 inserted to the shaft 8, then the squeezing bolt 7 is screwed using a tool such as a wrench from the side of the rotor fixture 1 in the condition in which the rotor fixture 1 is inserted to the shaft 8.

Thereby, as shown in FIG. 3, as the squeezing bolt 7 screwed to the tapped hole 13 of the diameter contracting deformation section 4 is turned around, the both sides of the splitting slit 6 which the above-mentioned squeezing bolt 7 passes through come near each other with elastic deformation, and the both inside peripheral surfaces of the both right and left sides are pressed on the peripheral surface of the shaft 8.

As the squeezing bolt 7 is screwed further, the space of the splitting slit 6 on the side opposite to the side of the splitting slit 6 where the squeezing bolt 7 passes through with respect to the above-mentioned squeezing hole 5 begins to expand. With the increasing of the expansion, the space of the diameter expanding slit 15 of the diameter expanding deformation section 3 connected to the above-mentioned two sections of the diameter contracting deformation section 4 with interposition of the joint section 16 is expanded.

As shown in FIG. 4, when the space of the diameter expanding slit 15 is expanded, the peripheral surface of the diameter expanding deformation section 3 is also expanded toward the outside, and is forced on the inside peripheral surface of the central hole 9B of the boss 9A, then the rotor 9 is fixed to the diameter expanding deformation section 3 in the condition shown in FIG. 2. When the expansion is continued up to the condition in which the deformation toward outside of the peripheral surface of the diameter expansion deformation section 3 is restricted by the inside peripheral surface of the central hole 9B of the boss 9A, the space of the diameter expanding slit 15 becomes difficult to expand more, the inside peripheral surface of the squeezing hole 5 is pressed tightly on the shaft 8 to fix the diameter contracting deformation section 4 on the shaft 8 by screwing the squeezing bolt 7, thus the shaft 8 and the rotor 9 are combined solidly with interposition of the rotor fixture 1.

As described herein above, in this embodiment, the slit 2 is cut-formed in fan-shape in a range of central angle of about 270 degrees in the diametral direction from the one location of the peripheral surface of the rotor fixture 1, therefore the residual fan-shaped joint section 16 is formed on both sides of the splitting slit 6, thereby respective joint sections 16 are easily twist-deformed and transmit efficiently the elastic deformation of the diameter contracting deformation section 4 to the diameter expanding deformation section 3, and also the rigidity to the bending load applied on the joint section 16 is large, therefore the angular deviation between the axes of the diameter expanding deformation section 3 and diameter contracting deformation 4 is difficult to occur, thus the error of mounting angle of the axis line of the rotor 9 to the shaft 8 is reduced.

Figure 5:
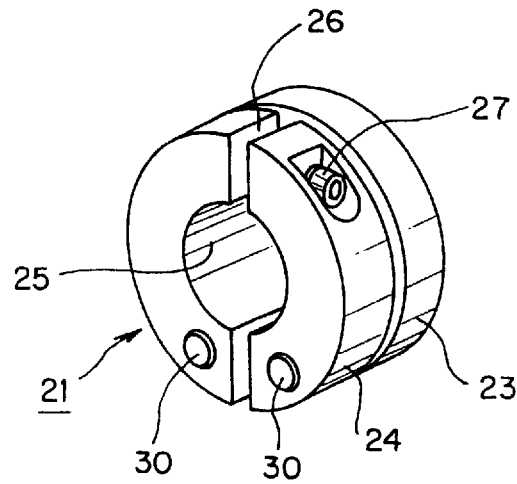
FIG. 5 is a perspective view of a rotor fixture illustrating the second embodiment of the present invention.
Figure 6:
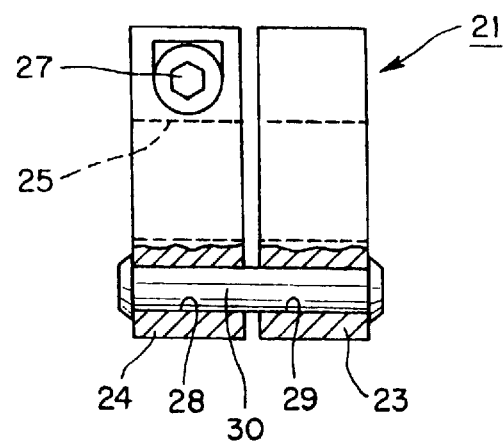
FIG. 6 is a side view of the rotor fixture including a partially cutaway cross-section illustrating the second embodiment of the present invention.

Next, FIG. 5 and FIG. 6 shows the second embodiment of the rotor fixture of the present invention, FIG. 5 is a perspective view, and FIG. 6 is a partially cutaway cross-sectional side view. In the case of the rotor fixture 21 shown in the figures, the diameter expanding deformation section 23 and the diameter contracting deformation section 24 are provided adjacently as separated individual independent parts.

Rivet holes 28 are formed through the diameter contracting deformation section 24 in the axial direction on the both sides of the splitting slit 26 on the side opposite across the through hole 25 to the side where the squeezing bolt 27 of the diameter contracting deformation section 24 slit to two sections by the splitting slit 26 is mounted. On the diameter expanding deformation section 23, rivet holes 29 are formed through the diameter expanding deformation section 23 in the axial direction with an axial line coincided with that of the above-mentioned rivet holes 28, and rivets 30 are inserted through the rivet holes 28 and 29.

The above-mentioned rivets 30 are caulked or peened-over at both ends, the diameter expanding deformation section 23 and diameter contracting deformation section 24 are combined together solidly, and the two sections of the diameter contracting deformation section 24 slit by the splitting slit 26 are combined so that the two sections are deformed solidly with portions on both sides near the diameter expanding slit, not shown in the figures, of the diameter expanding deformation section 23. Other portions are structured in the same manner as described in the above-mentioned first embodiment.

Figure 7:
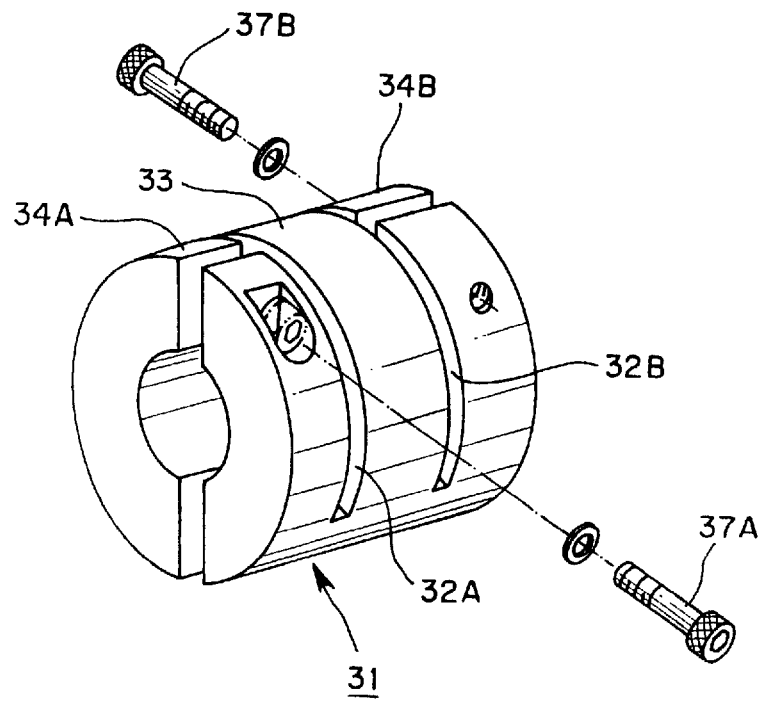
FIG. 7 is a perspective view of a rotor fixture illustrating the third embodiment of the present invention.

FIG. 7 is a perspective view for illustrating the third embodiment of the rotor fixture of the present invention, in the case of the rotor fixture 31 of this embodiment, by two slits 32A and 32B cut-formed in the radial direction from one location on the peripheral surface, two diameter contracting deformation sections 34A and 34B are formed on both sides of the diameter expanding deformation section 33 symmetrically.

Respective portions of the above-mentioned two diameter contracting deformation sections 34A and 34B and diameter expanding deformation section 33 are structured in the same manner as described in the above-mentioned first embodiment.

In this embodiment, the rotor fixture 21 is inserted to a shaft, not shown in the figure, in the condition in which the central hole of the rotor, not shown in the figure, is engaged on the peripheral surface of the diameter expanding deformation section 33, both squeezing bolts 37A and 37B mounted on the diameter contracting deformation sections 34A and 34B projected from the both sides of the above-mentioned rotor are screwed to fix the above-mentioned rotor fixture 31 to the shaft and rotor.

In this embodiment, the squeezing bolt 37A and the squeezing bolt 37B are inserted from the reversed direction each other for each diameter contracting deformation section 34A or 34B so that the squeezing performance of the rotor fixture 31 to the shaft is not different dependently on the direction of load torque, however if the direction of load torque loading on the shaft is not changed, the squeezing bolt 37A and squeezing bolt 37B may be inserted in the same direction.

Figure 8:
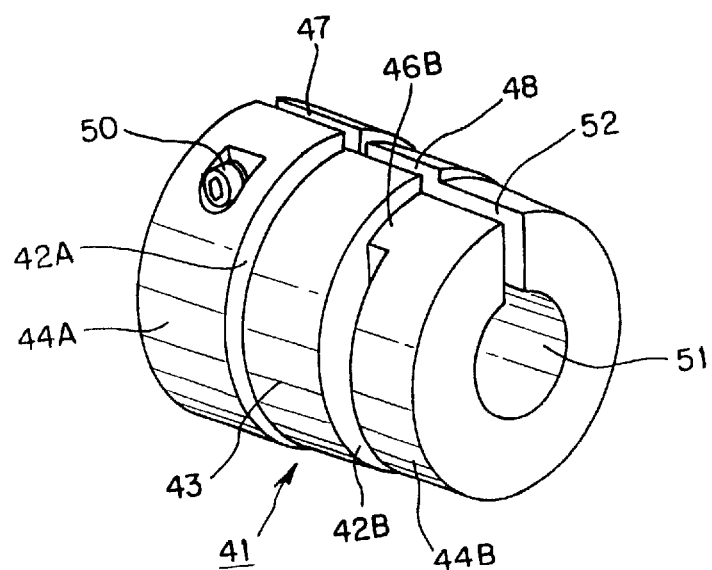
FIG. 8 is a perspective view of a rotor fixture illustrating the fourth embodiment of the present invention.
Figure 9:
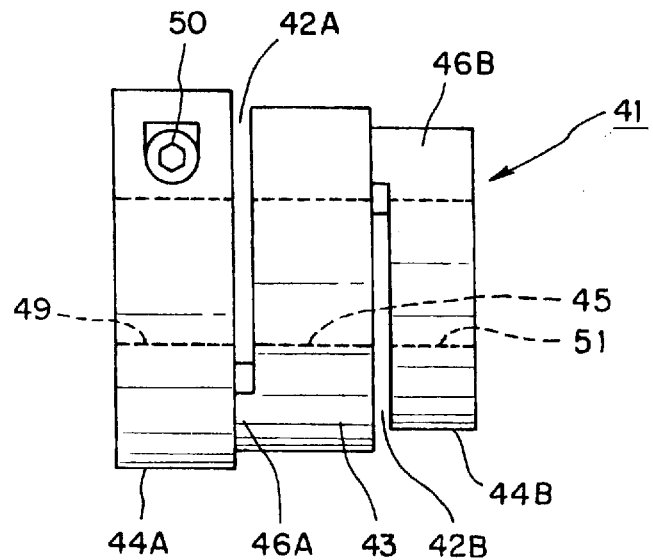
FIG. 9 is a side view of the rotor fixture illustrating the fourth embodiment of the present invention.

Next, FIG. 8 is a perspective view for illustrating the fourth embodiment of the rotor fixture of the present invention, and FIG. 9 is a side view of this embodiment. In this embodiment, by a slit 42A cut-formed in the diametral direction from one location on the peripheral surface of a rotor fixture 41 and a slit 42B cut-formed in the diameter direction from the opposite side, the rotor fixture 41 is sectioned to the diameter expanding deformation section 43, diameter contracting deformation section 44A, and auxiliary diameter contracting deformation section 44B.

A through hole 45 to which a shaft passes through at the center of the hole 45 is formed on the above-mentioned diameter expanding deformation section 43, and the diameter expanding deformation section 43 is combined solidly to the diameter contracting deformation section 44A by the joint section 46A which is remained under the slit 42A. A diameter expanding slit in the radial direction extending through to the through hole 45 from the peripheral surface is formed in the same manner as described in the first embodiment, though not shown in the figures.

A diameter contracting slit 48 formed in the radial direction, which diameter contracting slit 48 extends in the axial direction to the splitting slit 47 formed on the diameter contracting deformation section 44A and extends to the above-mentioned through hole 45 from one location of the peripheral surface, is cut-formed on the diameter expanding deformation section 43. The above-mentioned diameter contracting slit 48 is positioned at the opposite side of the diameter expanding slit not shown in the figures with respect to the through hole 45, and the diameter expanding deformation section 43 is sectioned in the diametric direction to two sections by the above-mentioned diameter expanding slit and diameter contracting slit 48. Herein, the above-mentioned diameter contracting slit 48 may be positioned not exactly opposite side of the diameter expanding slit with respect to the through hole 45, and may be deviated to some extent.

The above-mentioned diameter contracting deformation section 44A is structured in the same manner as that of the diameter contracting deformation section of the above-mentioned embodiment shown in FIG. 1, and is split to two sections by the splitting slit 47 which crosses in the diametric direction the squeezing hole 49 formed at the center, and the above-mentioned two sections are connected by the squeezing bolt 50 which crosses the above-mentioned slit 47.

At the center of the above-mentioned auxiliary diameter contracting deformation section 44B, an auxiliary squeezing hole 51 is formed coaxially with the above-mentioned through hole 45 and squeezing hole 49. At one location on the peripheral surface of the auxiliary diameter contracting deformation section 44B, a diameter contracting slit 52 is cut-formed which diameter contracting slit 52 extends through in the axial direction to the diameter expanding slit 48 of the diameter expanding deformation section 43, and extends in the radial direction to the auxiliary squeezing hole 51. The sections of both sides near the diameter contracting slit 48 of the above-mentioned diameter expanding deformation section 43 and the sections of both sides near the diameter contracting slit 52 of the auxiliary diameter contracting deformation section 44B are combined by the joint section 46B so as to be deformed integrally.

When the rotor fixture 41 of this embodiment is used, the rotor fixture 41 is inserted to a shaft, the central hole of the rotor not shown in the figures is engaged to the diameter expanding deformation section 43, then the squeezing bolt 50 is screwed. Thereby, in the same manner as described in the previous embodiments, the inside peripheral surface of the squeezing hole 49 of the diameter contracting deformation section 44A is pressed on the both sides of the shaft, the space of the splitting slit 47 in the area of the squeezing bolt 50 side from the squeezing hole 49 is narrowed, and the space of the splitting slit 47 in the opposite area is widened elastically. As the result, the expanding slit not shown in the figures of the diameter expanding deformation section 43 combined solidly with the diameter contracting deformation section 44A through the joint section 46A is widened, then the peripheral surface is pressed on the inside peripheral surface of the central hole of the rotor. When the squeezing bolt 50 is screwed more to widen the above-mentioned diameter expanding slit, the diameter expanding slit is forced to widen, but the deformation of the peripheral surface of the diameter expanding deformation section 43 toward both outsides is obstructed by the inside peripheral surface of the above-mentioned central hole, therefore, the space of diameter contracting slit 48 formed on the opposite side of the diameter expanding slit across the through hole 45 is narrowed. Thereby, the auxiliary diameter contracting deformation section 44B combined solidly with the diameter expanding deformation section 43 through the joint section 46B is deformed elastically to cause narrowing of the space of the diameter contracting slit 52, then the inside peripheral surface of the auxiliary squeezing hole 51 is pressed on the both sides of the periphery of the shaft. Thus, the rotor fixture 41 is fixed firmly to the shaft at two points of the squeezing hole 49 and auxiliary squeezing hole 51, and fixed to the rotor on the periphery of the diameter expanding deformation section 43. As shown in FIG. 8 and FIG. 9, the diameter of the diameter expanding deformation section 43, diameter contracting deformation section 44A, and auxiliary diameter contracting deformation section 44B is different each other, but all diameters may be the same for easy manufacturing.

Figure 10:
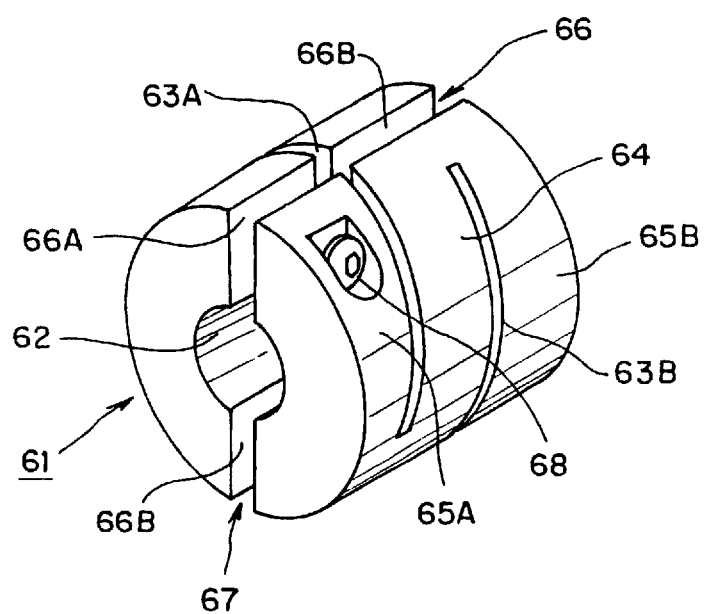
FIG. 10 is a perspective view of a rotor fixture illustrating the fifth embodiment of the present invention.

Next, FIG. 10 is a perspective view for illustrating the fifth embodiment of the present invention, the rotor fixture 61 comprises a cylindrical block which is deformable elastically and formed of a communicating hole 62 to be fitted with a shaft at the center of the rotor fixture, and the rotor fixture 61 is sectioned to three sections of a diameter expanding deformation section 64, diameter contracting deformation section 65A, and auxiliary diameter contracting deformation section 65B by the first slit 63A which is cut-formed beginning from one location on the peripheral surface of the rotor fixture 61 near the one end of the rotor fixture 61 to the point beyond the center of the above-mentioned communicating hole 62 in the direction slant to the above-mentioned one end and by the second slit 63B which is cut-formed beginning from a location on the other side on the peripheral surface near the other end of the rotor fixture 61 to the point beyond the center of the above-mentioned communicating hole 62 in the direction slant to the above-mentioned other end in the condition that three sections are combined each other. The inclination angle of the above-mentioned first slit 63A and the second slit 63B is 30 degrees or smaller to both end sides of the rotor fixture 61.

The half splitting slit 66A of the diameter contracting deformation section 65A and a diameter contracting slit 66B which extends through from the diameter expanding deformation section 64 to the auxiliary diameter contracting deformation section 65B are formed by providing the third slit 66 which is formed in the radial direction extending through from the beginning position of the first slit 63A on the periphery of the rotor fixture 61 to the position of the communicating hole 62 across the first slit 63A.

Further, the other half splitting slit 66B of the diameter contracting deformation section 65A which extends through from the diameter contracting deformation section 65A to the diameter expanding deformation section 64 and a diameter expanding slit not shown in the figure are formed by providing the fourth slit 67 which is formed in the radial direction extending through from the beginning position of the second slit 63B on the periphery of the rotor fixture 61 to the position of the communicating hole 62 across the above-mentioned second slit 63B.

The diameter expanding deformation section 64, diameter contracting deformation section 65A, and auxiliary diameter contracting deformation section 65B function respectively in the same manner as the diameter expanding deformation section 43, diameter contracting deformation section 44A, and auxiliary diameter contracting deformation section 65B in the fourth embodiment shown in FIG. 8 and FIG. 9, however, in this embodiment, the first slit is cut-formed with inclination, therefore the difference in cross sectional area between the portion where the squeezing bolt 68 extends through and the other portion is small, the strength can be increased, and the strain which is caused when a rotor fixture 61 is worked is reduced.

The above-mentioned communicating hole 62 functions in the same manner as the through hole in the above-mentioned fourth embodiment at the position of the diameter expanding deformation section 64, and also functions as a squeezing hole at the position of the diameter contracting deformation section 65A, further functions as an auxiliary squeezing hole at the position of the auxiliary diameter contracting deformation section 65B.

Figure 11:
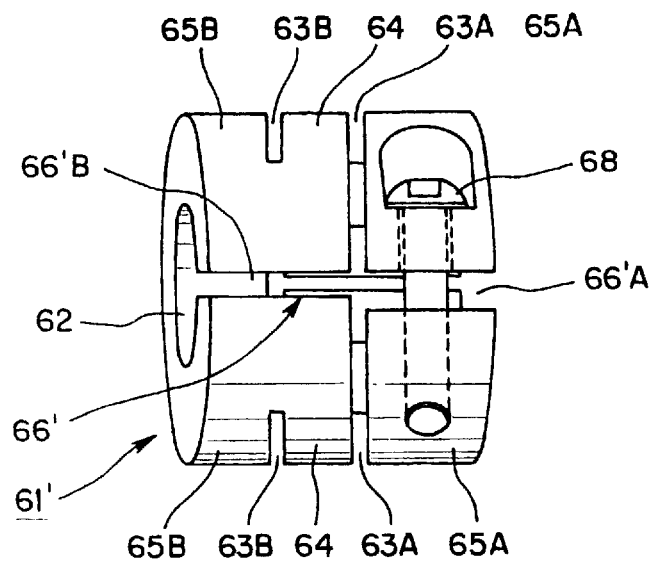
FIG. 11 is a view of a rotor fixture illustrating a modified embodiment of the fifth embodiment of he present invention.
Figure 12:
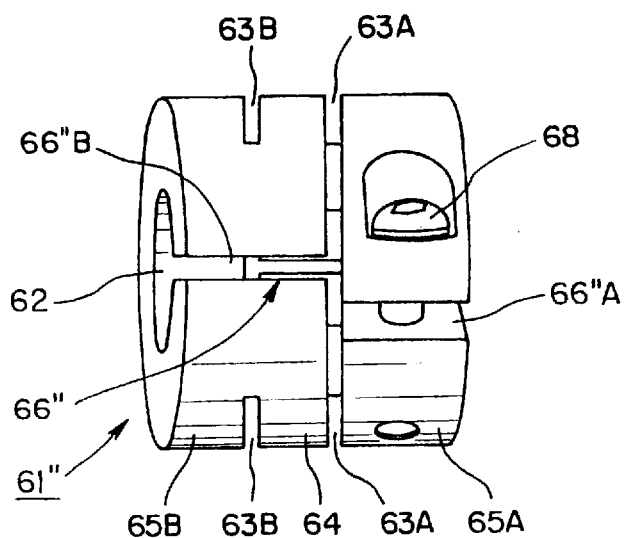
FIG. 12 is a view of a rotor fixture illustrating a modified embodiment of the fifth embodiment of the present invention.

FIG. 11 and FIG. 12 are plan views for illustrating modification of the above-mentioned fifth embodiment, the rotor fixture 61' shown in FIG. 11 has the third slit 66' in which the width of the portion forming the half slit 66'A of the diameter contracting deformation section 65A is wider than the portion of the diameter contracting slit 66'B of the diameter expanding deformation section 64 and auxiliary diameter contracting deformation section 65B. The wider width of the portion 66'A which forms the half of the above-mentioned splitting slit allows the increased squeezing margin of the squeezing bolt 68, then allows tight squeezing.

The rotor fixture 61" shown in FIG. 12 has a third slit 66" in which the portion 66"A forming the half of the splitting slit of the diameter contracting deformation section 65A is formed with slight offset or deviation in the circumferential direction from the portion forming the diameter contracting slit 66"B of the diameter expanding deformation section 64 and auxiliary diameter contracting deformation section 65B.

The portions having the same reference numerals provided in FIG. 10 as shown in FIG. 11 and FIG. 12 perform the same functions as described in FIG. 10.

In the above-mentioned embodiments, the splitting slit extends across the squeezing hole of the diameter contracting deformation section in the diametric direction and is formed so as to divide the diameter contracting deformation section to two equal sections, but the half of the splitting slit of the one side of the squeezing hole and the other half of the splitting slit may be different slightly in the direction, and may be different slightly in the width of the splitting slits.

Figure 13:
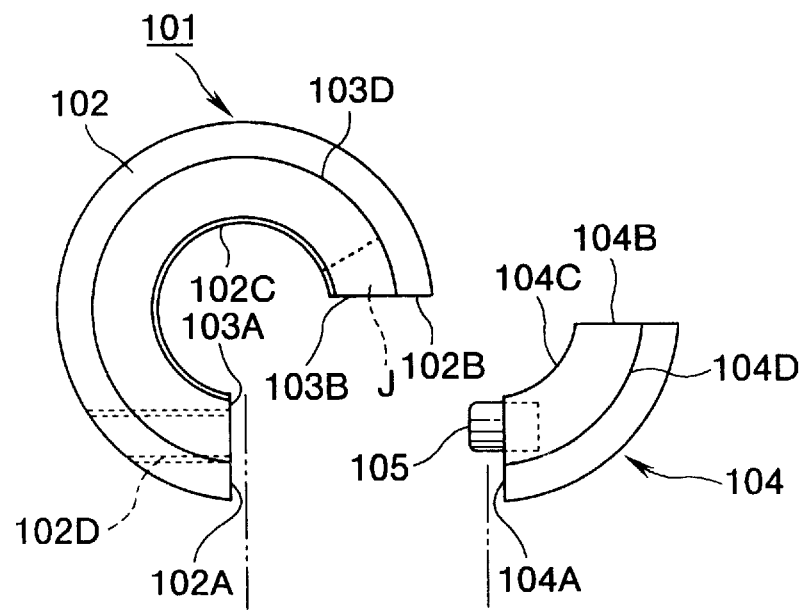
FIG. 13 is an exploded plan view of a rotor fixture illustrating the sixth embodiment of the present invention.
Figure 14:
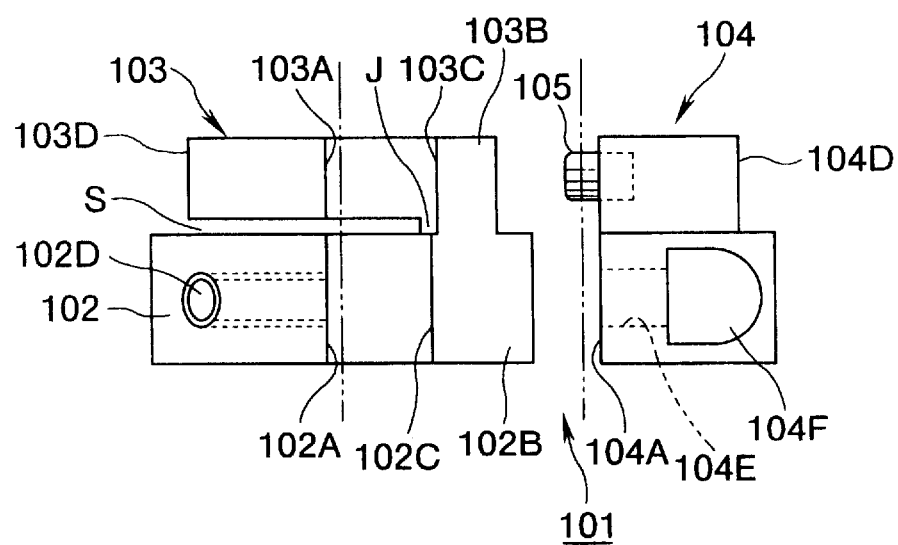
FIG. 14 is an exploded side view of the rotor fixture illustrating the sixth embodiment of the present invention.

Next, FIG. 13 shows an exploded plan view of a rotor fixture for illustrating the sixth embodiment of the rotor fixture in accordance with the present invention, FIG. 14 is a side view of the rotor fixture, the rotor fixture 101 comprises a diameter contracting deformation section 102 and diameter expanding deformation section 103, wherein both sections are formed in fan-shaped in the cross-section with a central angle of about 270 degrees and are combined each other adjacently in the axial direction coaxially, and a bridge 104 with a fan-shaped cross-section with the central angle of about 90 degrees is provided with interposition of spaces between both ends 102A and 102B and 103A and 103B in the circumferential direction of the diameter contracting deformation section 102 and diameter expanding deformation section 103.

On the inside of the above-mentioned diameter contracting deformation section 102, a radii peripheral surface 102C to be fitted to the peripheral surface of a shaft to be fixed is formed, and a screw hole 102D is formed through in the tangential direction extending from the end 102A toward the peripheral surface. The diameter contracting deformation section 102 is combined to the diameter expanding deformation section 103 with the joint section J having a fan-shaped cross-section provided on the side near the end 102B, the diameter contraction deformation section 102 and the diameter expanding deformation section 103 are separated with the interposition of a narrow slit S in the area other than the portion of the above-mentioned joint section J.

The diameter of the inside peripheral surface 103C of the diameter expanding deformation section 103 is formed slightly larger than the diameter of the radii inside peripheral surface 102C of the diameter contracting deformation section 102, and the peripheral surface 103D of the diameter expanding deformation section 103 is formed so that the radius fits to the inside peripheral surface of the central hole of the rotor to be fixed.

On the one side in the circumferential direction of the above-mentioned bridge section 104, the end 104A which is facing respectively to the end 102A of the diameter contracting deformation section 102 and the end 103A of the diameter expanding deformation section 103 is formed, and on the other side, the end 104B which is facing respectively to the end 102B of the diameter contracting deformation section 102 and the end 103B of the diameter expanding deformation section 103 is formed, in addition, the inside peripheral surface 104C to be fitted with the peripheral surface of the above-mentioned shaft is formed on the inside. Further, the radius of the peripheral surface of the portion of the bridge section 104 corresponding to the diameter expanding deformation section 103 is formed so as to fit with the inside peripheral surface of the center hole of the above-mentioned rotor.

On the other hand, at the position facing to the screw hole 102D for screwing of a squeezing bolt not shown in the figure provided on the end 102A of the diameter contracting deformation section 102, a bolt inserting hole 104E is formed through in the tangential direction from the end 104A of the bridge section 104 toward the periphery, and around the portion having an opening on the peripheral surface, a recess 104F is cut-formed for accommodation of the head of the above-mentioned squeezing bolt. At the position on the end 104A of the bridge section 104 facing to the end 103A of the diameter expanding deformation section 103, a stopper pin 105 is provided projectedly.

In this embodiment, a straight cylindrical pin is used as the above-mentioned stopper pin 105, and the pin is fixed by inserting partially it to the hole formed on the end 104A, but the pin may be a pin with a step having the different diameters for the portion inserted to the above-mentioned hole and for the portion exposed outside from the end 104A, otherwise, using a bolt or locking screw as the stopper pin, a screw hole is formed on the end 104A and the bolt or locking screw is screwed to fix. The space between the end 103A of the diameter expanding deformation section 103 and the end 104A of the bridge section 104 is prescribed by the stopper pin.

Figure 15:
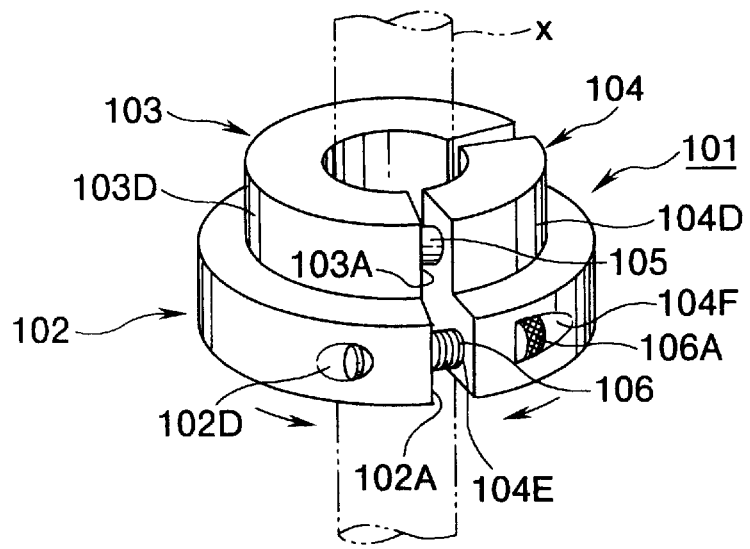
FIG. 15 is a perspective view of the rotor fixture illustrating the sixth embodiment of the present invention.

FIG. 15 is a perspective view of a rotor fixture 101 having the structure described herein above in the condition that the rotor is fabricated and fixed to the periphery of the shaft X, the bridge section 104 is combined to the diameter contracting deformation section 102 by the squeezing bolt 106 screwed to the screw hole 102D on the diameter contracting deformation section 2 through the bolt inserting hole 104E, and the head 106A of the above-mentioned squeezing bolt 106 is supported by the seat of the recess 104F.

In this embodiment, a hexagonal head bolt with a hole is used as the squeezing bolt 106, but in the case that the size of the rotor fixture 101 is small, a lock screw which can be screwed using a driver may be used as the squeezing bolt. In the figure, through a rotor is not shown, the peripheral surface 103D of the diameter expanding deformation section 103 and the peripheral surface 104D of the bridge section 104 are engaged to the central hole formed on the boss of the rotor.

Figure 16:
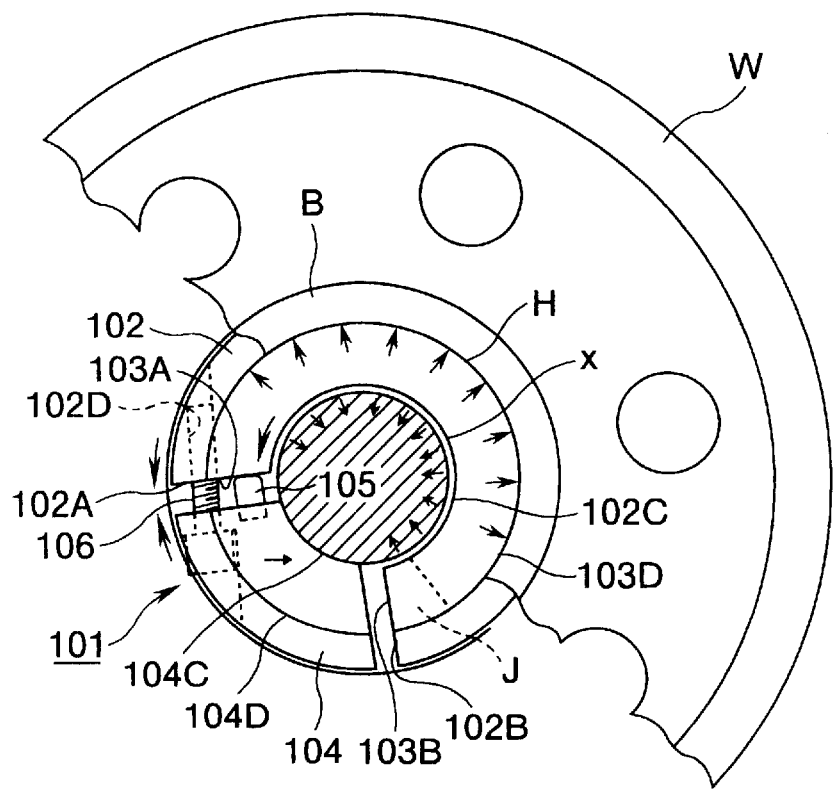
FIG. 16 is a view of the rotor fixture illustrating the functional principle in the sixth embodiment of the present invention.

Next, FIG. 16 is a view of the rotor fixture 101 having the structure as described herein above from the diameter expanding deformation section 103 side for illustrating the operational principle of the rotor fixture 101, when the rotor is fixed to the shaft X, first the rotor fixture 101 is inserted to the shaft from the shaft end in the condition that the squeezing bolt 106 is unscrewed, then the peripheral surface 103 of the diameter expanding deformation section 103 and the peripheral surface 104D of the bridge section 104 are engaged to the central hole H of the boss B of the rotor W.

Then, the rotor fixture 101 is moved in the axial direction to set the fixing position of the rotor W to the shaft X, thereafter the squeezing bolt 106 is screwed, then the end 102A of the diameter contracting deformation section 102 is forced to draw in the circumferential direction near to the bridge section 104. As the result, the inside peripheral surface 102C of the diameter contracting deformation section 102 is brought to a contact with the peripheral surface of the shaft X, therefore the diameter contracting deformation section 102 is exerted with a twisting torque in the anti-clockwise direction in the figure, the above-mentioned torque is transmitted to the diameter expanding deformation section 103 side through the joint section J on the side near the end 102B, the diameter expanding deformation section 103 is deformed rotationally to the anti-clockwise direction around the shaft X, and is brought to a contact with the stopper pin 105 of the bridge section 104.

When the inside peripheral surface 104C of the bridge section 104 is in contact with the shaft (FIG. 16), and the peripheral surface 104D of the bridge section 104 is in contact on the inside peripheral surface of the central hole H formed on the boss B, the rotation on the shaft X of the diameter expanding deformation section 103 is obstructed by the stopper pin 105, the end 103A of the diameter expanding deformation section 103 is stressed with the reaction force from the stopper pin 105, the diameter expanding deformation section 103 is deformed elastically to expand in the radial direction toward the outside, thus the peripheral surface 103D is pressed on the inside peripheral surface of the central hole H.

Thereby, because the deformation in the circumferential direction of the joint section J (which is combined solidly with the diameter expanding deformation section 103) is restricted, when the squeezing bolt 106 is screwed more, the end 102A of the diameter contracting deformation section 102 is drawn in the anti-clockwise direction around the shaft X, the diameter contracting deformation section 102 is deformed elastically and the inside peripheral surface of the diameter contracting deformation section 102 is pressed on the peripheral surface of the shaft X, thus the rotor W is fixed with friction to the shaft X with interposition of the rotor fixture 101.

In this embodiment, the stopper pin 105 is in contact to the end 103A of the diameter expanding deformation section 103 from the bridge section 104 side, but the rotor fixture 101 may be structured in the form of a single continuous part by omitting the stopper pin 105 and forming the bridge section 104 monolithically with the above-mentioned end 103A.

Figure 17:
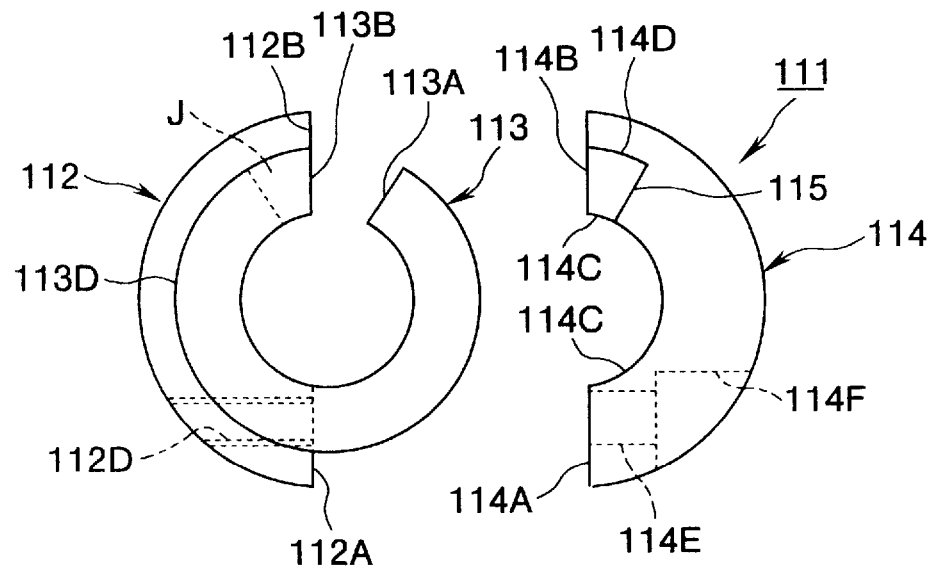
FIG. 17 is an exploded plan view of a rotor fixture illustrating the seventh embodiment of the present invention.
Figure 18:
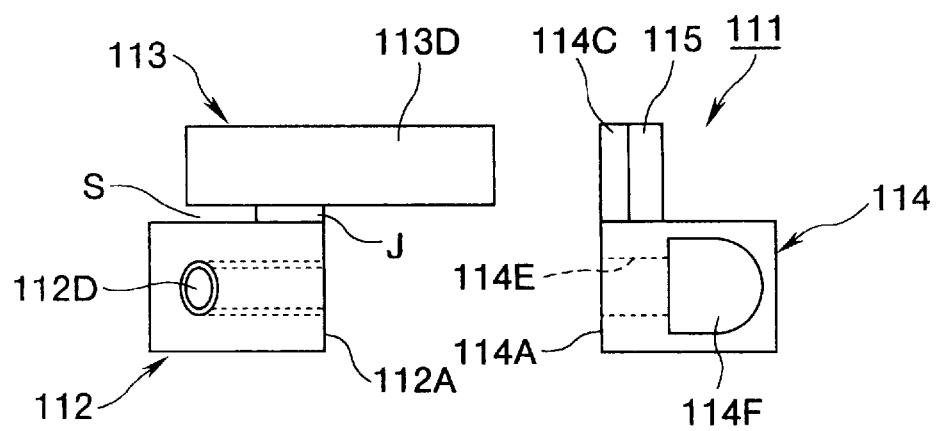
FIG. 18 is an exploded side view of the rotor fixture illustrating the seventh embodiment of the present invention.

Next, FIG. 17 is an exploded plan view of a rotor fixture for illustrating the seventh embodiment of the rotor fixture in accordance with the present invention, and FIG. 18 is a side view of the rotor fixture, the rotor fixture 111 comprises a diameter contracting deformation section 112 in the form of a fan-shape segment having the central angle of about 180 degrees and a diameter expanding deformation section 113 in the form of a fan-shape segment having the central angle of about 330 degrees, both deforming sections 112 and 113 are combined each other coaxially in the axial direction adjacently, a bridge section 114 in the form of a fan-shape segment is provided between both ends 112A and 112B, and 113A and 113B.

The end 112B of the diameter contracting deformation section 112 and the end 113B of the diameter expanding deformation section 113 are combined continuously in the axial direction, and a joint section J in the form of a fan-shape segment is formed at the portion near the ends 112B and 113B for combining the diameter contracting deformation section 112 and the diameter expanding deformation section 113. The diameter contracting deformation section 112 and diameter expanding deformation section 113 are separated by the slit S in the area other than the portion of the above-mentioned joint section J.

The portion of the above-mentioned bridge section 114 facing to the ends 112A and 112B of the diameter contracting deformation section 112 is formed as a fan-shaped segment having the central angle of about 180 degrees, and on the other hand, the portion of the above-mentioned bridge section 114 provided between the ends 113A and 113B of the diameter expanding deformation section 113 is formed as a fan-shaped segment having the central angle of about 30 degrees, and a stopper face 115 is provided facing to one end 113A in the circumferential direction of the diameter expanding deformation section 113. The radius of the inside peripheral surface 114C of the bridge section 114 is formed so as to fit with the peripheral surface of the shaft, and the radius of the portion of the peripheral surface 114D facing to the diameter expanding deformation section 113 is formed so as to fit on the inside peripheral surface of the central hole of the above-mentioned rotor.

Like the sixth embodiment described herein above, a screw hole 112D is provided for screwing of a squeezing bolt not shown in the figure on the diameter contracting deformation section 112, and a bolt inserting hole 114E and a recess 114F for accommodation of the head of the squeezing bolt are formed corresponding to the above-mentioned screw hole 112D on the bridge section 114.

Figure 19:
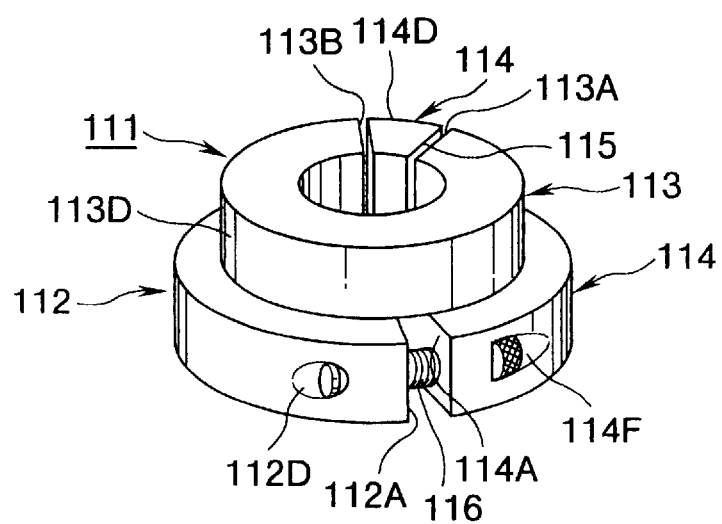
FIG. 19 is a perspective view of the rotor fixture illustrating the sixth embodiment of the present invention.

FIG. 19 is a perspective view for illustrating the above-mentioned rotor fixture 111 in the fabricated condition, as shown in the figure, the stopper face 115 of the portion of the bridge section 114 which portion is located between both ends 113A and 113B in the circumferential direction of the diameter expanding deformation section 113 is in contact on the above-mentioned one end 113A. Like the sixth embodiment described herein above, the rotor fixture 111 is fixed on a shaft not shown in the figure, the diameter expanding deformation section 113 and a part of the bridge section 114 are engaged in the central hole of the rotor not shown in the figure, and the squeezing bolt 116 is screwed, then the end 112A of the diameter contracting deformation section is drawn near to the end 114A side of the bridge section 114, therefore the end 113A of the diameter expanding deformation section 113 combined to the diameter contracting deformation section 112 is pressed on the stopper face 115 of the bridge section 114.

As the result, the diameter expanding deformation section 113 is deformed elastically to press the peripheral surface 113D on the inside peripheral surface of the central hole of the rotor. Thereby, the deformation in the circumferential direction of the end 113B side of the diameter expanding deformation section 113 is restricted, therefore when the squeezing bolt 116 is screwed more, then the diameter contracting deformation section 112 is deformed elastically to squeeze the shaft between the inside peripheral surface of it and the inside peripheral surface of the bridge section 114, thus the rotor is fixed on the shaft with interposition of the rotor fixture 111.

In this embodiment, the central angle of the fan-shaped cross-section of the diameter contracting deformation section 112 is different from that of the diameter expanding deformation section 113, and the central angle of the fan-shaped cross-section of the portion of the bridge section 114 facing to the diameter contracting deformation section 112 is different from the central angel of the fan-shaped cross-section of the portion of the bridge section 114 facing to the diameter expanding deformation section 113, however, the same principle as described in the sixth embodiment is operated also in this embodiment.

In the sixth embodiment described herein above, the one end in the circumferential direction of the diameter expanding deformation section is in contact on the stopper pin provided on the end of the bridge section which stopper pin is facing to the one end, on the other hand in this embodiment, the end 113A of the diameter expanding deformation section 113 is in contact directly on the stopper face 115 which is facing to the end 113A, thereby the number of parts are reduced.

Figure 20:
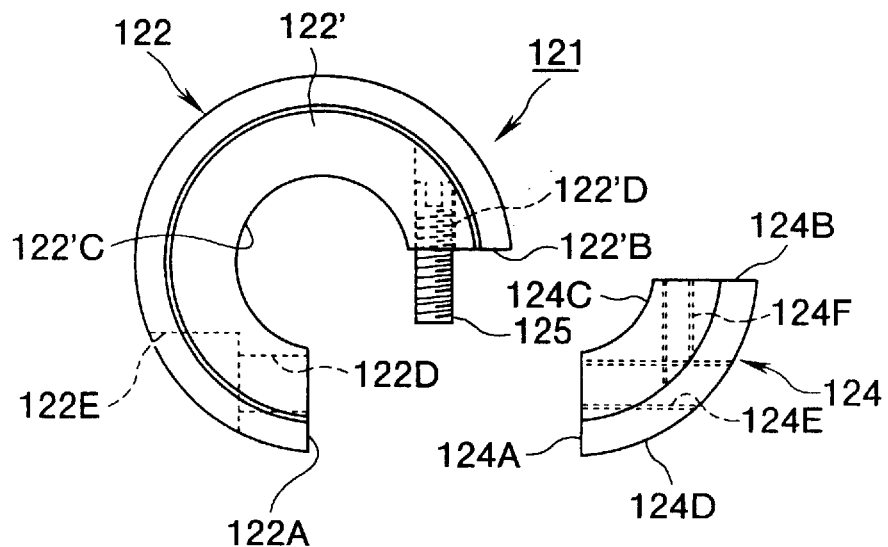
FIG. 20 is an exploded plan view of a rotor fixture illustrating the eighth embodiment of the present invention.
Figure 21:
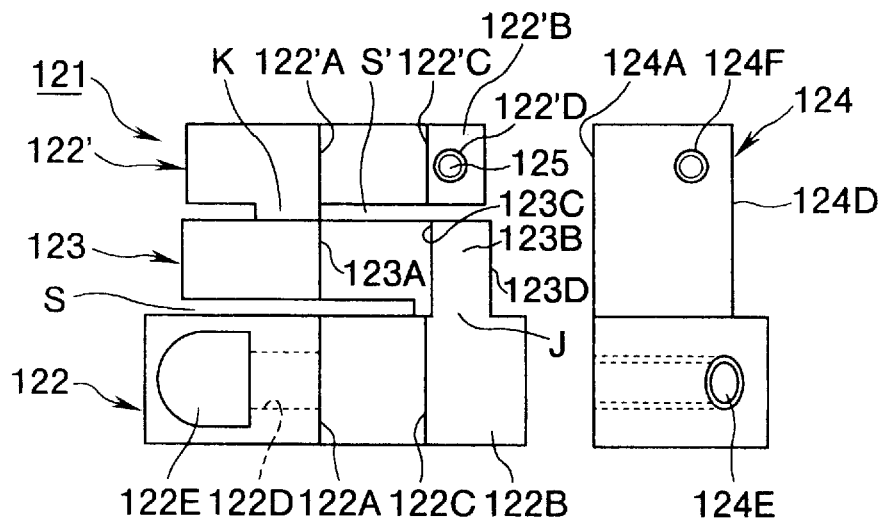
FIG. 21 is an exploded side view of the rotor fixture illustrating the eighth embodiment of the present invention.

Next, FIG. 20 is an exploded plan view of the rotor fixture for illustrating the eighth embodiment of the present invention, FIG. 21 is the side view of the rotor fixture, the rotor fixture 121 comprises the first diameter contracting deformation section 122, a diameter expanding deformation section 123, and the second diameter contracting deformation section 122', wherein all the sections have the fan-shaped cross-section with the central angel of about 270 degrees respectively, and all the sections are combined each other adjacently in the axial direction coaxially, a bridge section 124 having the fan-shaped cross-section with a central angle of about 90 degrees is provided with spaces between both ends 122A and 122B, 123A and 123B, and 122'A and 122'B in the circumferential direction of the above-mentioned first diameter contracting deformation section 122, diameter expanding deformation section 123, and second diameter contracting deformation section 122' respectively.

On the inside of the above-mentioned first diameter contracting deformation section 122, a radii inside peripheral surface 122C to be fitted to the peripheral surface of the shaft to be fixed is formed, and a bolt inserting hole 122D for inserting a squeezing bolt not shown in the figure through the first diameter contracting deformation section 122 in the tangential direction from the end 122A toward the peripheral surface is formed, and on the around of the portion where the bolt inserting hole 122D has an opening on the peripheral surface, a recess 122E is cut-formed for accommodation of the head of the above-mentioned squeezing bolt.

The first diameter contracting deformation section 122 and the diameter expanding deformation section 123 are combined each other through the joint section J having the fan-shaped cross-section near the end 122B and 123B, and the first diameter contracting deformation section 122 is separated from the diameter expanding deformation section 123 by the narrow slit S in the area other than the portion of the above-mentioned joint section J. The diameter expanding deformation section 123 and the second diameter contracting deformation section 122' are combined each other near the ends 123A and 122'A through the joint section K having the fan-shaped cross-section, and are separated by the narrow slit S' in the area other than the portion of the joint section K.

The radius of the inside peripheral surface 123C of the diameter expanding deformation section 123 is slightly larger than the radii inside peripheral surface 122C of the first diameter contracting deformation section 122, and the radius of the peripheral surface 123D of the diameter expanding deformation section 123 is formed so as to be fitted to the inside peripheral surface of the central hole of the rotor to be fixed.

Further, on the second diameter contracting deformation section 122', a radii inside peripheral surface 122'C having the same radius as the radii inside peripheral surface 122C of the first diameter contracting deformation section 122 is formed coaxially with the above-mentioned radii inside peripheral surface 122C, and the radius of the peripheral surface is slightly smaller than the radius of the peripheral surface 123D of the adjacent diameter expanding deformation section 123. Through the above-mentioned diameter contracting deformation section 122', a screw hole 122' is formed in the tangential direction from the end 122' toward the peripheral surface.

On the bridge section 124, the end 124 A is formed on the one side in the circumferential direction facing to the end 122A of the first diameter contracting deformation section 122, the end 123A of the diameter expanding deformation section 123, and the end 122'A of the second diameter contracting deformation section 122' respectively, and the end 124B is formed on the other side in the circumferential direction facing to the end 122B of the first diameter contracting deformation section 122, the end 123B of the diameter expanding deformation section 123, and the end 122'B of the second diameter contracting deformation section 122', and the inside peripheral surface 124A to be fitted on the peripheral surface of the above-mentioned shaft is formed.

The radius of the portion of the peripheral surface 124D of the bridge section 124 facing to the diameter expanding deformation section 123 is formed so as to fit on the inside peripheral surface of the central hole of the above-mentioned rotor, and at the position facing to the bolt inserting hole 122D having the opening on the end 122A of the first diameter contracting deformation section 122, a screw hole 124E is formed through the bridge section 124 for screwing of the squeezing bolt in the tangential direction from the end 124A of the bridge section 124 toward the peripheral surface.

On the other hand, a screw hole 124F for screwing of the joint screw 125 is formed on the end 124B facing to the screw hole 122'D having the opening on the end 122'B of the second diameter contracting deformation section 122'. In this embodiment, a hexagon socket set screw is used as the above-mentioned joint screw 125 so that the head does not project from the peripheral surface of the diameter contracting deformation section.

When the above-mentioned screw hole 122D' and screw hole 124F are formed, the fixing precision of the joint screw 125 is improved by applying a procedure in which the rotor fixture 121 is manufactured by cutting a solid material, prepared holes for the screw hole 122D and 124D are formed, a tap is inserted, then the bridge section 124 is separated.

In this embodiment, like respective embodiments described herein above, the squeezing bolt is inserted in the bolt inserting hole 122D of the first diameter contracting deformation section 122 to screw it to the screw hole 124E of the bridge section 124, and the end 122' of the second diameter contracting deformation section 122' is combined to the end 124B of the bridge 124 to fabricate the rotor fixture 121, thereafter the rotor fixture 121 is mounted on the shaft, and the peripheral surface 123D of the diameter expanding deformation section 123 and the peripheral surface 124D of the bridge section 124 are engaged to the central hole of the rotor, and the squeezing bolt is screwed, the twist torque exerted to the first diameter contracting deformation section 122 is transmitted to the diameter expanding deformation section 123 through the joint section J, and further transmitted to the second diameter contracting deformation section 122' through the joint section K.

As the result, the deformation in the circumferential direction of the end 122'B of the second diameter contracting deformation section 121' is restricted in relation to the end 124B of the bridge section 124 by the joint screw 125, therefore the second diameter contracting deformation section 121' is deformed elastically, then the inside peripheral surface 122'C thereof is pressed on the peripheral surface of the shaft. On the other hand, the diameter expanding deformation section 123 is deformed elastically toward the outside, then the peripheral surface 123D thereof is pressed on the inside peripheral surface of the center hole of the rotor. Simultaneously, the first diameter contracting deformation section 122 is also deformed elastically by the above-mentioned twist torque, then the inside peripheral surface thereof is pressed on the peripheral surface of the shaft. When, the inclination in the axial direction of the inside peripheral surface 124C and peripheral surface 124D of the bridge section 124 is restricted by the peripheral surface of the shaft and the inside peripheral surface of the central hole of the rotor respectively, thus the rotor is combined and fixed to the shaft with interposition of the rotor fixture.

Figure 22:
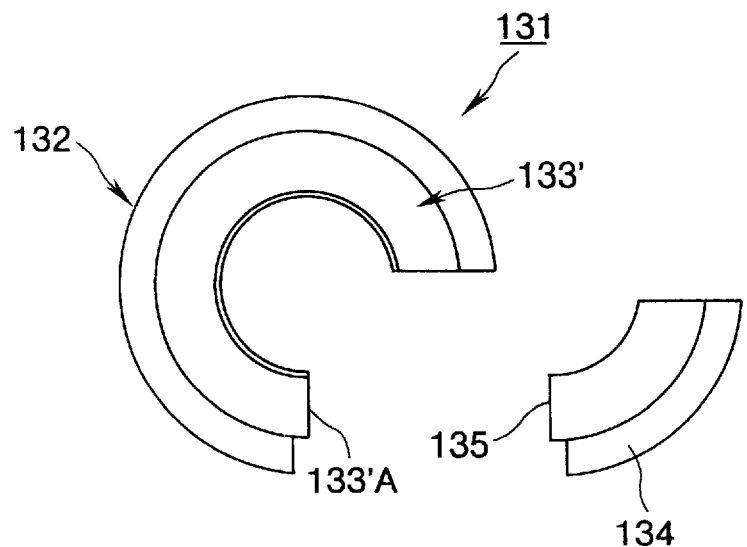
FIG. 22 is an exploded plan view of a rotor fixture illustrating the ninth embodiment of the present invention.
Figure 23:
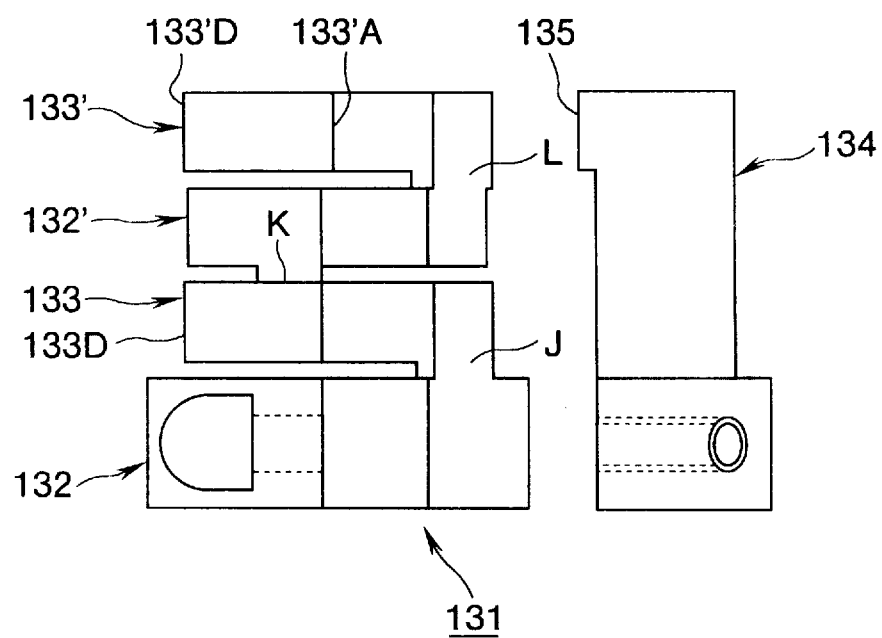
FIG. 23 is an exploded side view of a rotor fixture illustrating the ninth embodiment of the present invention.

Next, FIG. 22 is an exploded plan view of a rotor fixture for illustrating the ninth embodiment of the present invention, and FIG. 23 is a side view of the rotor fixture shown in FIG. 22, and in the figures, the rotor fixture 131 comprises the first diameter contracting deformation section 132, first diameter expanding deformation section 133, second diameter contracting deformation section 132', and second diameter expanding deformation section 133', wherein all the sections have a fan-shaped cross-section, are combined each other with interposition of joint sections J, K, and L, and a bridge section 134 is provided between the peripheral ends of these sections, the first diameter contracting deformation section 132, the first diameter expanding deformation section 133, and diameter contracting deformation section 132' are structured in the same manner as those shown in FIG. 20 and FIG. 21 described herein above.

In this embodiment, the second diameter expanding deformation section 133' is added adjacent to the second diameter contracting deformation section 132', and the rotor fixture is structured so that the end 133'A on the side apart in the circumferential direction from the joint section L contacts to the stopper face 135 formed on the bridge section 134, and so that the rotor is fixed with friction by the peripheral surface 133D of the first diameter expanding deformation section 133 and the peripheral surface 133'D of the second diameter expanding deformation section 133'.

Figure 24:
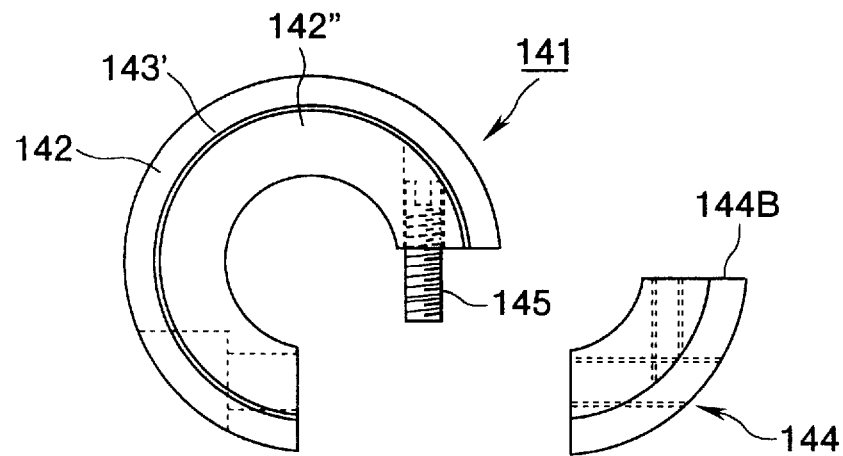
FIG. 24 is an exploded plan view of a rotor fixture illustrating the tenth embodiment of the present invention.
Figure 25:
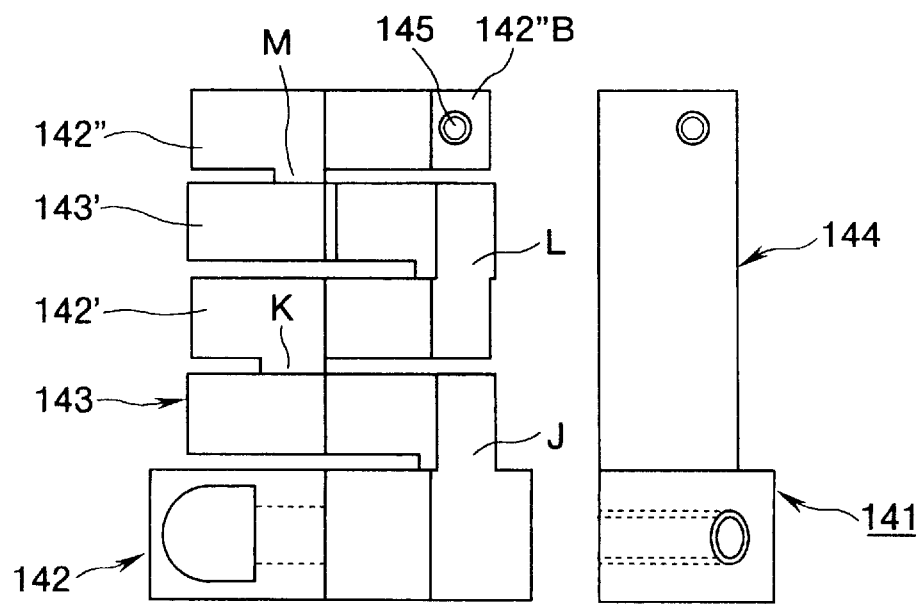
FIG. 25 is an exploded plan view of the rotor fixture illustrating the tenth embodiment of the present invention.

FIG. 24 is an exploded plan view of a rotor fixture of the tenth embodiment of the present invention, FIG. 25 is a side view of the rotor fixture shown in FIG. 24, and in the figures, the rotor fixture 141 of this embodiment is added with one additional diameter contracting deformation section to the rotor fixture of the above-mentioned ninth embodiment.

In detail, the first diameter contracting deformation section 142, first diameter expanding deformation section 143, second diameter contracting deformation section 142', second diameter expanding deformation section 143', and the third diameter contracting deformation section 142" are combined each other with joint sections J, K, L, and M respectively, a bridge section 144 is provided between the peripheral ends, and the end 142"B on the free end side of the third diameter contracting deformation section is combined in the circumferential direction to the facing end 144B of the bridge section 144 by a joint screw 145 in the same manner as that of the eighth embodiment described hereinbefore.

Figure 26:
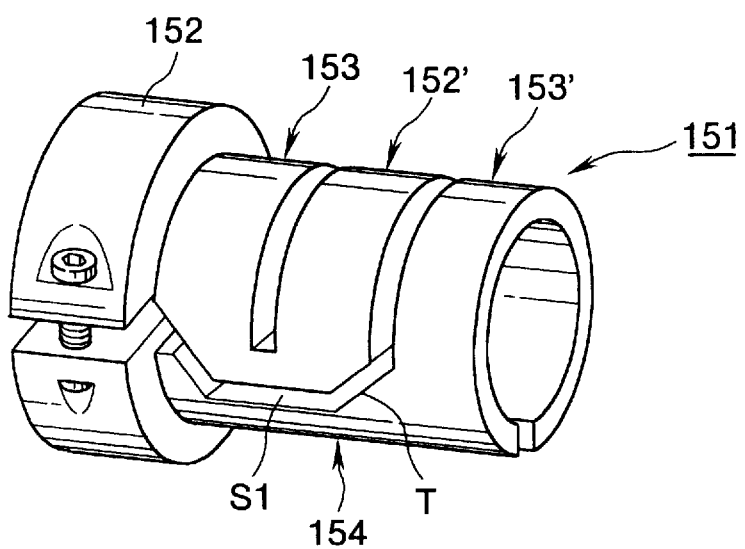
FIG. 26 is a perspective view of a rotor fixture illustrating the eleventh embodiment of the present invention.

Next, FIG. 26 is a perspective view of a rotor fixture for illustrating the eleventh embodiment of the present invention, and in the figure, the rotor fixture 151 has a structure in which the end on the free end side of the second diameter expanding deformation section of the rotor fixture of the ninth embodiment described hereinbefore in FIG. 22 and FIG. 23 is combined to the stopper face of the bridge section. The above-mentioned rotor fixture 151 is formed monolithically of a single material which is capable of elastic deformation by cutting work such as lathing, drilling, and slitting to form the first diameter contracting deformation section 152, first diameter expanding deformation section 153, second diameter contracting deformation section 152', and second diameter expanding deformation section 153, and the bridge section 154.

Particularly, in this embodiment, the slit S1 which separates the bridge section 154 from the first diameter expanding deformation section 153 and the second diameter contracting deformation section 152' has an inclined portion T with an inclination to the axial direction between the second diameter contracting deformation section 152' and the second diameter expanding deformation section 153'. As the result, the bridge section 154 is strengthened at the joint portion between the second diameter expanding deformation section 153' and the bridge section 154, and the central angle of the fan-shaped cross-section of the first diameter expanding deformation section 153 and second diameter contracting deformation section 153' is made larger, then the larger central angel allows the elastic deformation to be easy.

Figure 27:
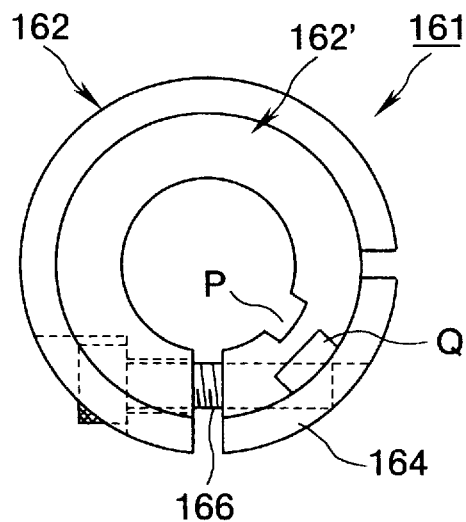
FIG. 27 is an exploded plan view of a rotor fixture illustrating the twelfth embodiment of the present invention.
Figure 28:
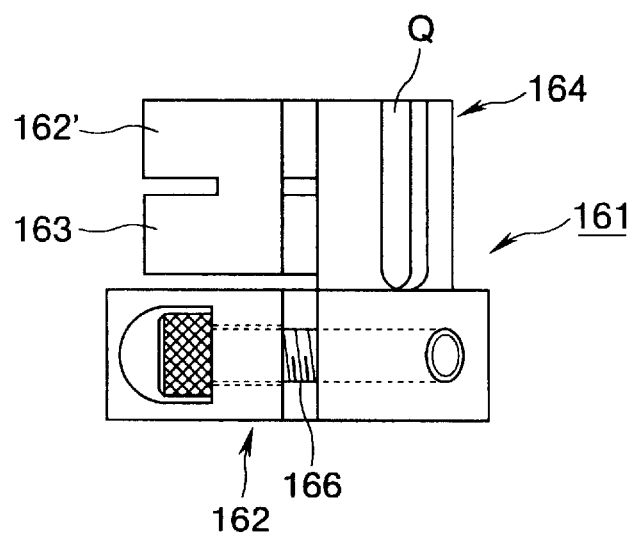
FIG. 28 is an exploded plan view of the rotor fixture illustrating the twelfth embodiment of the present invention.

Further, FIG. 27 and FIG. 28 are plan and side view of a rotor fixture for illustrating the twelfth embodiment of the present invention, and in the figure, the rotor fixture has a structure that the second diameter contracting deformation section and the bridge section of the rotor fixture as described in the eighth embodiment shown in FIG. 20 and FIG. 21 are formed monolithically in a continuous body instead of combining with the joint screw in the eighth embodiment.

In detail, the rotor fixture 161 is formed by cutting work of a single material for forming the first diameter contracting deformation section 162, diameter expanding deformation section 163, and second diameter contracting deformation section 162', and bridge section 164 in the same manner as described in the eleventh embodiment. Further, in this embodiment, key ways P and Q are formed in the axial direction at the position where it does not interfere with the squeezing bolt 166 on the inside peripheral surface and peripheral surface of the bridge section 164.

When the rotor fixture 161 is provided between the shaft and rotor and the squeezing bolt 155 is screwed, the tensile force in the circumferential direction on the bridge section 164 from the squeezing bolt 166 and the tensile force in the circumferential direction on the bridge section 164 from the second diameter contracting deformation section 162' are exerted as a couple of force to incline the bridge section 164 from the axial direction. The bridge section 164 is forced to contact from the one side of the shaft and inside peripheral surface of the central hole of the rotor by the above-mentioned couple of force, and in particular when the central angle of the bridge section 164 is small, the resultant large areal pressure on the contact portion causes galling on the shaft and rotor.

To cope with this problem, when the rotor fixture 161 of this embodiment is used, a shaft and rotor on which key ways are formed facing to the above-mentioned key ways P and Q are used. When the rotor fixture 161 is mounted, a key is inserted in the axial direction to the key ways which are facing each other, the couple of force exerted on the bridge section 164 arising from screwing of the squeezing bolt 166 is received by the shaft and rotor through the key.

As described herein above, by using the key, the areal pressure at the contact portion of the bridge section 164 is reduced, therefore the galling on the shaft and rotor is prevented, and also happening of slipping between the shaft and rotor is prevented.

Figure 29:
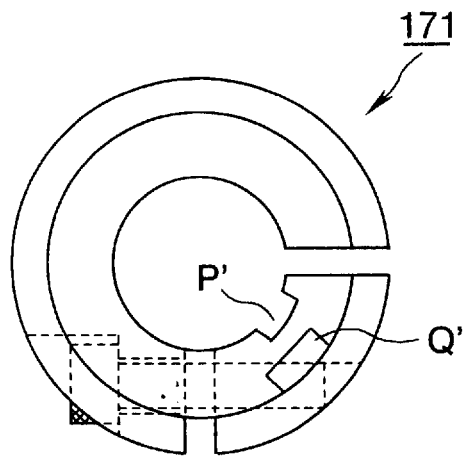
FIG. 29 is an exploded plan view of a rotor fixture illustrating the thirteenth embodiment of the present invention.
Figure 30:
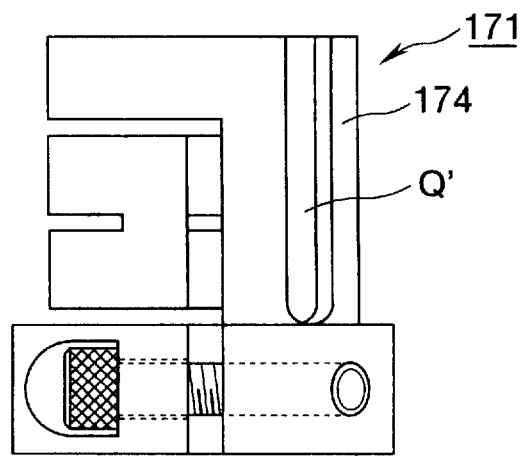
FIG. 30 is an exploded side view of the rotor fixture illustrating the thirteenth embodiment of the present invention.

FIG. 29 and FIG. 30 are plan and side views of a rotor fixture for illustrating the thirteenth embodiment of the present invention. The rotor fixture of this embodiment has the structure that key ways P' and Q' are formed in the axial direction in the same manner as those described in the above-mentioned twelfth embodiment on the inside peripheral surface and peripheral surface of the bridge section 174 of the rotor fixture 171 which is structured monolithically in the same manner as those described in the above-mentioned eleventh embodiment.

In the rotor fixtures 161 and 171 of the above-mentioned eleventh embodiment and thirteenth embodiment, the key way is formed on both inside peripheral surface and peripheral surface of the bridge sections 164 and 174, however the key way may be formed on any one of the inside peripheral surface or peripheral surface.

Figure 31:
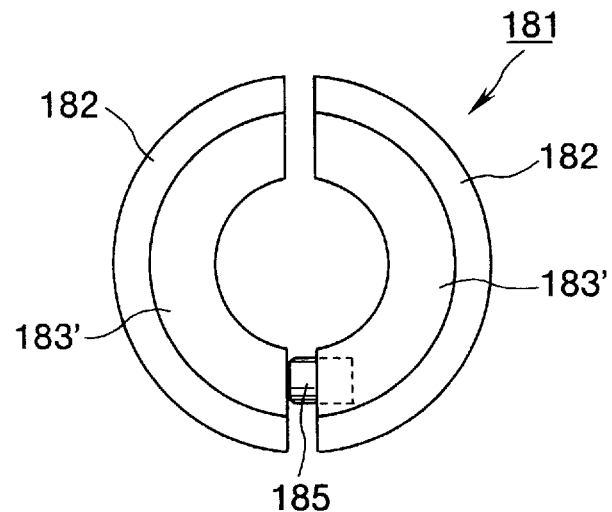
FIG. 31 is an exploded plan view of a rotor fixture illustrating the fourteenth embodiment of the present invention.
Figure 32:
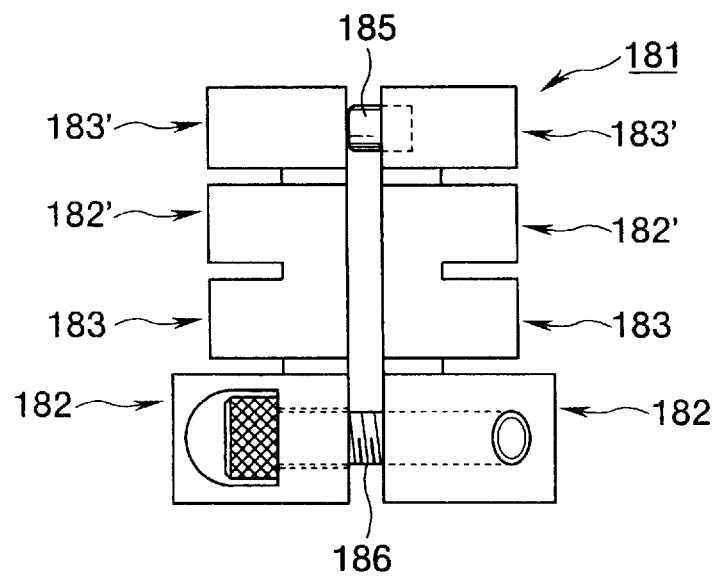
FIG. 32 is an exploded side view of the rotor fixture illustrating the fourteenth embodiment of the present invention.

Next, FIG. 31 and FIG. 32 are a plan view and a side view of a rotor fixture for illustrating the fourteenth embodiment of the present invention. The rotor fixture 181 of this embodiment comprises pairs of the first diameter contracting deformation sections 182, first diameter expanding deformation sections 183, second diameter contracting deformation sections 182', and second diameter expanding deformation section 183' wherein all the sections have the fan-shaped cross-section with the central angle of about 180 degrees and all the pairs are positioned facing each other symmetrically on both sides of a plane which includes the center line of the shaft as the symmetry plane.

Between the end on the free end side of the one second diameter expanding deformation section 183' and the end on the free end side of the other second diameter expanding deformation section 183', a stopper pin 185 which projects from the one side end and contacts on the other side ends is provided, the ends of free end sides of diameter contracting deformation sections 182 are combined each other by a squeezing bolt 186.

In this embodiment, one set of the first diameter contracting deformation section 182, first diameter expanding deformation section 183, second diameter contracting deformation section 182', and second diameter expanding deformation section 183' functions as the bridge section in respective embodiments described hereinbefore, because the rotor fixture 181 has the plane symmetrical structure, the force exerted from the rotor fixture 181 on the inside peripheral surface of the central hole of the rotor and peripheral surface of the shaft is symmetrical on both sides of the shaft, therefore, the deviation of the shaft center between the rotor and shaft is prevented.

As the material used for the rotor fixture described in the above-mentioned respective embodiments, generally metallic material which is elastically deformable and has high strength such as steel is suitable, however in the case that only a small torque is transmitted between the shaft and rotor, non-metallic material such as engineering plastics having high strength may be used.

As described hereinbefore, according to the rotor fixture of the present invention, comparing with the conventional rotor fixture used in a method in which an inner race engaged to a shaft and outer race engaged to a rotor, namely a pair of taper rings wedge-engaged each other, are tightened by screwing many bolts, the rotor fixture of the present invention can combine tightly a shaft and rotor involving wide pressure receiving area by only screwing one or two bolts, the mounting work is very easy and rapid.

Further, mounting work for mounting a rotor to a shaft is operated by screwing a squeezing bolt from the side of the shaft, therefore the work does not need a working space in the axial direction, and the work can be operated in a narrow space.

A rotor fixture of the present invention does not needs large number of parts structured simply, and is manufactured monolithically by lathing, drilling, and slitting a single cylindrical steel material, therefor it is advantageous also in easy manufacturing and low manufacturing cost.

In all of the embodiments, the rotor fixture has a first section adapted to be clamped within the bore of the rotor by expansion of its outer periphery, and a second section adapted to be clamped onto the shaft by contraction of its central bore. The second section has a slot extending diagonally throughout the section in a plane extending along the axis of the shaft to form complementary partial-circular segments separated by the slot.

A fastener is engaged between the segments of the second section on one side of the shaft to cause the slot on one side of the shaft to close and allow the second section to grip the shaft. Further closure of the slot on the fastener side causes the slot on the opposite side of the shaft to enlarge and effect separation of the segments on the opposite side of the section. The first section has a slot extending radially from the shaft outwardly through its outer periphery in axial alignment with the diagonal slot of the second section. The first section has two partial-circular segments joined with the two partial circular segments of the second section on the side opposite from the fastener so that when the slot between the segments of the second section is enlarged, the slot between the segments of the first section is likewise enlarged to clamp the first section within the bore of the rotor.

There may be two, three or four sections allowing one or two sections to clamp against the inside bore of the rotor and the other sections to clamp against the shaft. The slots may divide the sections into halves in the form of semi-circular arcs or segments, or the slots may divide the sections to form two arcs or segments, one ¼-circular and the other ¾-circular. The arcs or segments may also be separable from each other. For example, the second section is formed of two separated segments, one segment ⅚ circular and a second segment ⅙ circular. The two segments of each section may be formed integrally or separated, and may include keyways to avoid gulling on the shaft and rotor.

While particular embodiments of the invention have been herein illustrated and described, it is not intended to limit the invention to such disclosures, but changes and modifications may be made therein and thereto within the scope of the following claims.

I claim:

1. For mounting a rotor on a shaft with an outer peripheral shaft surface, said rotor having a central hole surrounding the outer peripheral shaft surface, a rotor fixture provided with an elastically deformable, cylindrical diameter expanding deformation section having a side portion and a peripheral section surface to be engaged with the central hole of the rotor, and a through hole through which the shaft is to be inserted, and having a radial diameter expanding slit extending to said through hole formed by notching on one place of said peripheral section surface, and an elastically deformable diameter contracting deformation section having a side portion and a squeezing hole to be engaged with said shaft and being split to two sections by a splitting slit extending across said squeezing hole approximately in the diametral direction, wherein said diameter contracting deformation section is disposed adjacent to said diameter expanding deformation section, said side portions of said two sections are combined near the diameter expanding slit of said diameter expanding deformation section so as to be deformed integrally therewith, and said two sections are linked to each other by a squeezing bolt inserted through said diameter contracting deformation section across said splitting slit in regard to said squeezing hole on the side opposite to the side portion which is connected with said diameter expanding deformation section.

2. The rotor fixture as claimed in claim 1, wherein rivet holes are formed in the axial direction on the both side portions of said diameter expanding deformation section near the diameter expanding slit and on two portions of said diameter contracting deformation section, and the diameter expanding deformation section and the diameter contracting deformation section are combined so as to be deformed integrally with the aid of rivets inserted through the rivet holes on the side of the diameter contracting deformation section and the rivet holes on the side of the diameter expanding deformation section.

3. The rotor fixture as claimed in claim 1, wherein said diameter contracting deformation sections are disposed symmetrically on both sides of said diameter expanding deformation section.

4. The rotor fixture as claimed in claim 1, wherein an elastically deformable, auxiliary diameter contracting deformation section having an auxiliary squeezing hole to be engaged with said shaft and having a radial contracting slit extending to said auxiliary squeezing hole formed by notching on one place of the peripheral surface thereof is disposed adjacent to the side opposite to the side portion where the said diameter contracting deformation section is disposed adjacent to said diameter expanding deformation section, on said diameter expanding deformation section, a diameter contracting slit extending from the peripheral section surface to the through hole approximately to the opposite side to said diameter expanding slit and through hole is formed by notching, and both side portions near the diameter contracting slit of said diameter expanding deformation section are connected near the diameter contracting slit of said auxiliary diameter contracting deformation section so as to be deformed integrally respectively.

5. The rotor fixture as claimed in claim 4, wherein said diameter expanding deformation section, diameter contracting deformation section, and auxiliary diameter contracting deformation section are divided in a mutually connected state by a first slit cut-formed with inclination to the one end side from one side of the peripheral surface near the one end side of the elastically deformable cylindrical body having a communicating hole to be fitted into said shaft at the center to the half way beyond the center of said communicating hole, and a second slit cut-formed with inclination to the other end side from the other side of the peripheral section surface near the other end of said cylindrical body to the half way beyond the center of the communicating hole, so that the through hole of said diameter expanding deformation section, the squeezing hole of said diameter contracting deformation section, and the auxiliary squeezing hole of said auxiliary diameter contracting deformation section are formed from said communicating hole, said rotor fixture having a third slit formed radially extending from the starting position of cutting of the first slit on the outer peripheral surface of said cylindrical body to the position of said communicating hole across said first slit, forming half of the splitting slit of the diameter contracting deformation section and the diameter contracting slit extending from the diameter expanding deformation section to the auxiliary diameter contracting deformation section, and said rotor fixture having a fourth slit formed radially extending from the starting position of cutting of the second slit on the outer peripheral surface of said cylindrical body to said communicating hole continuously from the diameter contracting deformation section to the diameter expanding deformation section across said second slit, forming the residual half of the splitting slit of the diameter contracting deformation section and the diameter expanding slit of the diameter expanding deformation section.

6. For mounting a rotor on a shaft with an outer peripheral shaft surface, said rotor having a central hole with an inner peripheral hole surface surrounding the outer peripheral shaft surface, a rotor fixture comprising;

a diameter contracting deformation section with a fan-shaped cross-section having an inner peripheral contracting section surface in the form of a circular arc to be fitted to the peripheral shaft surface, a diameter expanding deformation section with a fan-shaped cross-section having an inner peripheral expanding section surface in the form of a circular arc along the outer peripheral shaft surface and an outer peripheral expanding section surface in the form of a circular arc to be fitted to the inner peripheral hole surface, said diameter expanding deformation section being disposed coaxially adjacent to one side of said diameter contracting deformation section, a bridge section with a fan-shaped cross-section having an inner peripheral bridge section surface in the form of a circular arc to be fitted to the outer peripheral shaft surface and an outer peripheral bridge section surface in the form of a circular arc to be fitted to the inner peripheral hole surface in a position at least facing to said diameter expanding deformation section, said bridge section with the fan-shaped cross-section being disposed between both ends in the circumferential direction of each of said diameter contracting deformation section and diameter expanding deformation section, and a squeezing bolt for connecting in the circumferential direction the one end in the circumferential direction of said diameter contracting deformation section with said bridge section, wherein said diameter contracting deformation section has a portion near the other end in the circumferential direction and said diameter expanding deformation section has a portion near the one end of said diameter expanding deformation section in the same circumferential direction as the other end, said portions being connected integrally with interposition of a joint section, and when said squeezing bolt is screwed, the deformation is restricted in the circumferential direction to said bridge section at the other end in the circumferential direction of said diameter expanding deformation section, whereby the diameter of the inner peripheral surface of said diameter contracting deformation section is contracted and the diameter of the peripheral surface of said diameter expanding deformation section is expanded.

7. The rotor fixture as claimed in claim 6, wherein said bridge section is formed integrally with the other end in the circumferential direction of said diameter expanding deformation section continuously.

8. For mounting a rotor on a shaft with an outer peripheral shaft surface, said rotor having a central hole surrounding the outer peripheral shaft surface, a rotor fixture comprising;

a first diameter contracting deformation section with a fan-shaped cross-section having an inner peripheral section surface in the form of a circular arc to be fitted to the outer peripheral shaft surface, a diameter expanding deformation section with a fan-shaped cross-section having an inner peripheral section surface in the form of a circular arc along the outer peripheral shaft surface and an outer peripheral section surface in the form of a circular arc to be fitted to the inner peripheral hole surface, said diameter expanding deformation section being disposed coaxially adjacent to the one side of said first diameter contracting deformation section, a second diameter contracting deformation section with a fan-shaped cross-section having an inner peripheral surface in the form of a circular arc to be fitted to the outer peripheral surface of said shaft, said second diameter contracting deformation section being disposed coaxially adjacent to said diameter expanding deformation section on the opposite side in the axial direction to said first diameter contracting deformation section, a bridge section with a fan-shaped cross-section having an inner peripheral surface in the form of a circular arc to be fitted to the outer peripheral surface of said shaft and an outer peripheral surface in the form of a circular arc to be fitted to the inner peripheral surface of the central hole of said rotor in a position at least facing to said diameter expanding deformation section, said bridge section with the fan-shaped cross-section being disposed between both ends in the circumferential direction of each of said first diameter contracting deformation section, diameter expanding deformation section, and second diameter expanding deformation section, and a squeezing bolt for connecting in the circumferential direction the one end in the circumferential direction of said first diameter contracting deformation section with said bridge section, wherein the first contracting section has a portion near the other end in the circumferential direction, and the expanding section has a portion in the same circumferential direction as said other end, said portions being connected integrally with interposition of a first joint section, the expanding section having a portion near the other end in the circumferential direction, said second diameter contracting deformation section having a portion near one end of said second diameter contracting deformation section in the same circumferential direction as said other end, said portions being integrally connected with interposition of a second joint section, and when said squeezing bolt is screwed, the deformation is restricted in the circumferential direction to said bridge section at the other end in the circumferential direction of said second diameter contracting deformation section, whereby the diameters of the inner peripheral surfaces in the form of a circular arc of respective said first diameter contracting deformation section and second diameter contracting deformation section are contracted, and the diameter of the outer peripheral surface in the form of a circular arc of said diameter expanding deformation section is expanded.

9. The rotor fixture as claimed in claim 8, wherein said bridge section is formed integrally with the other end in the circumferential direction of said second diameter contracting deformation section continuously.

10. For mounting a rotor on a shaft with an outer peripheral shaft surface, said rotor having a central hole surrounding the outer peripheral shaft surface, a rotor fixture comprising;

a first diameter contracting deformation section with a fan-shaped cross-section having an inner peripheral surface in the form of a circular arc to be fitted to the outer peripheral shaft surface, a first diameter expanding deformation section with a fan-shaped cross-section having an inner peripheral section surface in the form of a circular arc along the outer peripheral shaft surface and an outer peripheral section surface in the form of a circular arc to be fitted to the inner peripheral hole surface, said diameter expanding deformation section being disposed coaxially adjacent to one side of said first diameter contracting deformation section, a second diameter contracting deformation section with a fan-shaped cross-section having an inner peripheral section surface in the form of a circular arc to be fitted to the outer peripheral shaft surface, said second diameter contracting deformation section being disposed coaxially adjacent to said first diameter expanding deformation section on the opposite side in the axial direction to said first diameter contracting deformation section, a second diameter expanding deformation section with a fan-shaped cross-section having an inner peripheral section surface in the form of a circular arc along the outer peripheral shaft surface and an outer peripheral section surface in the form of a circular arc to be fitted to the inner peripheral hole surface, said second diameter expanding deformation section with the fan-shaped cross-section being disposed coaxially adjacent to said second diameter contracting deformation section on the opposite side in the axial direction to said first diameter expanding deformation section, a bridge section with a fan-shaped cross-section having an inner peripheral surface in the form of a circular arc to be fitted to the outer peripheral shaft surface and an outer peripheral bridge surface in the form of a circular arc to be fitted to the inner peripheral hole surface in a position at least facing to said first diameter expanding deformation section and second diameter expanding deformation section, said bridge section with the fan-shaped cross-section being disposed between both ends in the circumferential direction of each of said first diameter contracting deformation section, first diameter expanding deformation section, second diameter contracting deformation section, and second diameter expanding deformation section, and a squeezing bolt for connecting in the circumferential direction the one end in the circumferential direction of said first diameter contraction deformation section with said bridge section, wherein a first portion near the other end in the circumferential direction of said first diameter contracting deformation section is connected integrally with a second portion near one end of said first diameter expanding deformation section in the same circumferential direction as said other end with interposition of a first joint section, a third portion near the other end in the circumferential direction of said first diameter expanding deformation section is connected integrally with a fourth portion near one end of said second diameter contracting deformation section in the same circumferential direction as said other end, with interposition of a second joint section, a fifth portion near the other end in the circumferential direction of said second diameter contracting deformation section is connected integrally with a sixth portion near one end of said second diameter expanding deformation section same circumferential direction as said other end with interposition of a third joint section, and when said squeezing bolt is screwed, the deformation is restricted in the circumferential direction to said bridge section at the other end in the circumferential direction of said second diameter expanding deformation section, whereby the diameters of the inner peripheral surfaces in the form of a circular arc of respective said first diameter contracting deformation section and second diameter contracting deformation section are contracted, and the diameters of the outer peripheral surfaces in the form of a circular arc of respective said first diameter expanding deformation section and second diameter expanding deformation section are expanded.

11. The rotor fixture as claimed in claim 10, wherein said bridge section is formed integrally with the other end in the circumferential direction of said second diameter expanding deformation section continuously.

12. For mounting a rotor on a shaft with an outer peripheral shaft surface, said rotor having a central hole surrounding the outer peripheral shaft surface, a rotor fixture comprising;

a first diameter contracting deformation section with a fan-shaped cross-section having an inner peripheral section surface in the form of a circular arc to be fitted to the outer peripheral shaft surface, a first diameter expanding deformation section with a fan-shaped cross-section having an inner peripheral section surface in the form of a circular arc along the outer peripheral shaft surface and an outer peripheral section surface in the form of a circular arc to be fitted to the inner peripheral hole surface, said diameter expanding deformation section being disposed coaxially adjacent to the one side of said first diameter contracting deformation section, a second diameter contracting deformation section with a fan-shaped cross-section having an inner peripheral section surface in the form of a circular arc to be fitted to the outer peripheral shaft surface, said second diameter contracting deformation section being disposed coaxially adjacent to said first diameter expanding deformation section on the opposite side in the axial direction to said first diameter contracting deformation section, a second diameter expanding deformation section with a fan-shaped cross-section having an inner peripheral section surface in the form of a circular arc along the outer peripheral shaft surface and an outer peripheral section surface in the form of a circular arc to be fitted to the inner peripheral hole surface, said second diameter expanding deformation section with the fan-shaped cross-section being disposed coaxially adjacent to said second diameter contracting deformation section on the opposite side in the axial direction to said first diameter expanding deformation section, a third diameter contracting deformation section with a fan-shaped cross-section having an inner peripheral section surface in the form of a circular arc to be fitted to the outer peripheral shaft surface, said third diameter contracting deformation section being disposed coaxially adjacent to said second diameter expanding deformation section on the opposite side in the axial direction to said second diameter contracting deformation section, a bridge section with a fan-shaped cross-section having an inner peripheral bridge surface in the form of a circular arc to be fitted to the outer peripheral shaft surface and an outer peripheral bridge surface in the form of a circular arc to be fitted to the inner peripheral hole surface in a position at least facing to said first diameter expanding deformation section and second diameter expanding deformation section, said bridge section with the fan-shaped cross-section being disposed between both ends in the circumferential direction of each of said first diameter contracting deformation section, first diameter expanding deformation section, and second diameter contracting deformation section, second diameter expanding deformation section, and third diameter contracting deformation section, and a squeezing bolt for connecting in the circumferential direction the one end in the circumferential direction of said first diameter contracting deformation section with said bridge section, wherein a first portion near the other end in the circumferential direction of said first diameter contracting deformation section is connected integrally with a second portion near one end of said first diameter expanding deformation section in the same circumferential direction as said other end with interposition of a first joint section, a third portion near the other end in the circumferential direction of said first diameter expanding deformation section is connected integrally with a fourth portion near one end of said second diameter contracting deformation section in the same circumferential direction as said other end, with interposition of a second joint section, a fifth portion near the other end in the circumferential direction of said second diameter contracting deformation section is connected integrally with a sixth portion near one end of said second diameter expanding deformation section in the same circumferential direction as said other end with interposition of a third joint section, a seventh portion near the other end in the circumferential direction of said second diameter expanding deformation section is connected integrally with an eighth portion near one end of said third diameter contracting deformation section in the same circumferential direction as other end with interposition of a fourth joint section, and when said squeezing bolt is screwed, the deformation is restricted in the circumferential direction to said bridge section at the other end in the circumferential direction of said third diameter contracting deformation section, whereby the diameters of the inner peripheral surfaces in the form of a circular arc of respective said first diameter contracting deformation section, second diameter contracting deformation section, and third diameter contracting deformation section are contracted, and the diameters of the outer peripheral surfaces in the form of a circular arc of respective said first diameter expanding deformation section and second diameter expanding deformation section are expanded.

13. The rotor fixture as claimed in claim 12, wherein said bridge section is formed integrally with the other end in the circumferential direction of said third diameter contracting deformation section continuously.

14. The rotor fixture as claimed in claim 6, wherein keyways are formed in the axial direction at least on any one of the inner peripheral surface and outer peripheral surface of said bridge section.

15. The rotor fixture as claimed in claim 6, wherein said diameter contracting deformation sections and diameter expanding deformation sections are disposed on one side separated by a plane including the shaft axis, and said bridge section is disposed on the other side, having a shape approximately symmetrical with the diameter contracting deformation section and diameter expanding deformation section with respect to said plane.

16. A rotor fixture for mounting a rotor having a cylindrical bore on a cylindrical shaft, a first section adapted to be clamped within the bore of the rotor by expansion of its outer periphery, a second section adapted to be clamped onto the shaft by contraction of its central bore, the second section having complementary partial-circular segments separated circumferentially at two sides of the shaft, clamping means mounted in said second section on one side of the shaft operable to cause the segments on one side of the shaft to close and grip the shaft, further operation of the clamping means effecting separation of the segments on another side of the shaft, said first section having two partial-circular segments joined with the two segments of the second section at the other side of the shaft, so that when the segments of the second section are separated on the other side of the shaft by said clamping means, the segments of the first section are likewise separated to clamp the first section within the cylindrical bore of the rotor.

17. A rotor fixture according to claim 16, wherein said clamping means comprises a fastener operable to displace said segments circumferentially of said shaft.

* * * * *